United States Patent [19]

Subbarao

[11] Patent Number: 5,193,124
[45] Date of Patent: Mar. 9, 1993

[54] COMPUTATIONAL METHODS AND ELECTRONIC CAMERA APPARATUS FOR DETERMINING DISTANCE OF OBJECTS, RAPID AUTOFOCUSING, AND OBTAINING IMPROVED FOCUS IMAGES

[75] Inventor: Muralidhara Subbarao, Setauket, N.Y.

[73] Assignee: The Research Foundation of State University of New York, Albany, N.Y.

[21] Appl. No.: 537,117

[22] Filed: Jun. 15, 1990

[51] Int. Cl.$^5$ .............................................. G06K 9/36
[52] U.S. Cl. .......................................... 382/41; 382/1; 382/43; 358/218; 358/227; 356/3; 354/400
[58] Field of Search ..................... 382/1, 7, 41, 43, 49; 358/88, 218, 227; 356/3, 4, 8, 12; 354/400, 403, 404; 350/130

[56] References Cited

U.S. PATENT DOCUMENTS

| | | | |
|---|---|---|---|
| 4,141,032 | 2/1979 | Haeusler | 358/89 |
| 4,404,594 | 9/1987 | Hannan | 358/209 |
| 4,410,804 | 10/1983 | Stauffer | 250/578 |
| 4,490,851 | 12/1984 | Gerhart et al. | 382/43 |
| 4,573,191 | 2/1986 | Kikode et al. | 382/1 |
| 4,584,704 | 4/1986 | Ferren | 382/65 |
| 4,601,053 | 7/1986 | Grumet | 382/1 |
| 4,634,278 | 1/1987 | Ross et al. | 356/376 |
| 4,636,624 | 1/1987 | Ishida et al. | 250/201 |
| 4,640,620 | 2/1987 | Schmidt | 356/376 |
| 4,661,986 | 4/1987 | Adelson | 382/41 |
| 4,723,139 | 2/1988 | Ogasawara | 354/266 |
| 4,728,980 | 3/1988 | Nakamura et al. | 354/402 |
| 4,792,694 | 12/1988 | Shioya et al. | 250/558 |

FOREIGN PATENT DOCUMENTS 62-284314 of 1987 Japan .
63-127217 5/1988 Japan .

OTHER PUBLICATIONS

"Multiframe Image Point Matching and 3-D Surface Reconstruction", Mar. 1983, IEEE Transactions on Pattern Analysis and Machine Intelligence, vol. PAMI-5, No. 2.
"Measuring Curved Surfaces for Robot Vision", by Hall et al., in Computer, by The Computer Society of IEEE, pp. 42-53, Dec. 1982.
"A Perspective on Range Finding Techniques for Computer Vision", by R. A. Jarvis, in IEEE Transactions on Pattern Analysis and Machine Intelligence, vol. PAMI-5, No. 2, Mar. 1983.
"A New Sense for Depth of Field" by Alex Paul Pentland, Proceedings of Int. Joint Conference on Artificial Intelligence, Aug. 1985.
"A New Sense for Depth of Field", by Alex Paul Pentland, in IEEE Transactions on Pattern Analysis and Machine Intelligence, vol. PAMI-9, No. 4, Jul. 1987.
"Depth from Focus", by P. Grossmann, in Pattern Recognition Letters, vol. 5, pp. 63-69, Elsevier Science Publishers, B.V. (North Holland), Jan. 1987.

Primary Examiner—Jose Couso
Attorney, Agent, or Firm—Hoffmann & Baron

[57] ABSTRACT

The present invention is a method and apparatus for determining the distance of a surface patch of an object from a camera system and also for focusing a surface patch of such object as well as obtaining an improved focus image of the surface patch. The present invention also includes a method of determining a set of unknown parameters of a linear shift-invariant system. The camera system of the present invention has an aperture through which light enters, an image detector, an image forming optical system having first and second principal planes and a focal length, the second principal plane arranged closer to the image detector than the first principal plane, a light filter, a camera controller, and an image processor operatively connected to the image detector and to the camera controller. The camera is set to a first set of camera parameters which include the distance(s) between the second principal plane and the image detector, the diameter (D) of the camera aperture, the focal length (f) of the camera system and the spectral characteristic ($\lambda$) of light transmitted by the light filter. The apparatus and the method of the present invention are widely applicable and they significantly enhance the efficiency of image processing to provide the distance of an object and required changes in the camera parameters to focus the object.

22 Claims, 15 Drawing Sheets $L_1, L_2$: LENSES    $A_s$: APERTURE STOP    ID: IMAGE DETECTOR
LF: LIGHT FILTER    $P_1, P_2$: PRINCIPAL PLANES    O.A.: OPTICAL AXIS

COMPUTATIONAL METHODS AND ELECTRONIC CAMERA APPARATUS FOR DETERMINING DISTANCE OF OBJECTS, RAPID AUTOFOCUSING, AND OBTAINING IMPROVED FOCUS IMAGES

BACKGROUND OF THE INVENTION

The present invention relates to electronic camera apparatus and methods based on signal processing techniques for (i) determining the distance of objects from a camera system, (ii) rapid autofocusing of camera systems, and (iii) obtaining improved focus images from blurred images. In general, this invention relates to system parameter estimation and signal restoration in any linear shift-invariant system, i.e., a system that performs convolution operation on the input signal.

A wide variety of apparatus and methods are known for finding range (i.e. distance) of objects. A survey of these apparatus and methods is found in an article by R. A. Jarvis titled "A perspective on range finding techniques for computer vision" in the March 1983 issue of *IEEE Transactions on Pattern analysis and Machine Intelligence,* PAMI-5, No. 2, pages 122-139.

A common technique of finding the distance of an object from a camera involves focusing the object's image on the image detector. The distance is then determined from the camera setting. This technique is called depth-from-focusing. A comparative study of different depth-from-focusing methods is reported by E. Krotkov in an article titled "Focusing" in the October 1987 issue of *International Journal of Computer Vision,* Volume 1, No. 3, pages 223-238.

The depth-from-focusing technique involves (i) acquiring a large number (about 20 or more) of images for different camera settings, (ii) computing a focus measure for each of these images, and, (iii) determining the image from which the focus measure is a maximum and determining distance from the corresponding camera setting. The major drawbacks of this technique are (i) it is very slow because it involves acquiring many images for different camera settings, and (ii) it requires large computational resources in terms of memory space and processing power.

Two new methods for finding distance of objects are described by A. P. Pentland in a paper titled "A new Sense for Depth of Field" published in the Proceedings of the International Joint Conference on Artificial Intelligence, August, 1985. The same paper was revised and republished with minor changes in July 1987 in *IEEE Transactions on Pattern Analysis and Machine Intelligence,* Vol. PAMI-9, No. 4, pages 523-531.

The first method of Pentland uses a single image of an object. The object must contain a bright surface patch adjacent to a dark surface patch with a common straight border in between. Such an object produces a straight edge which is a step discontinuity in the focused image. A closely related method is disclosed by P. Grossman in a paper titled "Depth from Focus" published in *Pattern Recognition Letters,* Vol. 5, pages 63-69, Jan. 1987. A much improved and more general version of these same methods is disclosed by this inventor in a paper titled "Depth Recovery from Blurred Edges," published in the Proceedings of IEEE Computer Society conference on Computer Vision and Pattern Recognition, June 1988, Pages 498-503. However, objects having bright and dark surface patches with a common straight border in between are rare in this world. Therefore it is not applicable in most cases.

The second method of Pentland is based on comparing two images, one image formed with a very small (pin-hole) aperture and the other image formed with a normal aperture. Application of this method poses some serious practical difficulties. A very small aperture increases the effects of diffraction which distorts the image. Further, a smaller aperture gathers lesser light and therefore increases exposure period. These problems make the method inaccurate, slow, and of limited use in practical applications.

In addition to determining the distance of objects, the present invention advances technology for rapid autofocusing of electronic cameras. It has been known to autofocus cameras by several methods. One method for autofocusing has been disclosed in Japanese Patent No. 62284314 dated 1987. This method is believed to be incorrect in theory, inaccurate, and, consequently, of limited use in practice because of the following reasons. The method disclosed in the '314 Japanese Patent involves moving the lens with respect to a fixed object. Therefore, the correspondence between the two images of a point object, e.g., the first image taken before moving the lens and the second image taken after moving the lens, cannot be established. This problem, which is referred to as correspondence problem, is well known in stereo-vision. Furthermore, the method as set forth in the '314 Japanese disclosure does not provide a magnification correction step so that errors are introduced into the process. Moreover, the method referred to above is very restricted in scope since it involves changing only one camera parameter—the position of the lens.

Further drawbacks with regard to the method set forth in Japanese '314 disclosure include the use of at least three pictures, and reliance on only high spatial frequencies—and even then only a fixed spatial frequency for autofocusing.

Another autofocusing method titled "Focal Point Detector" has been disclosed by Takeshi Baba, et al. in Japanese Patent No. 63-127217 laid open on May 31, 1988. The Japanese '217 disclosure suffers from the same drawbacks a set forth above with regard to the Japanese '314 disclosure, and is applicable only when the Modulation Transfer Function (MTF) is a Gaussian function. The Gaussian is a very crude approximation to the actual MTF of the camera system. Therefore, the method of '217 Japanese disclosure is also subject to error.

A previous method and apparatus for finding the distance of objects and autofocusing has been disclosed by the same inventor in commonly-owned copending U.S. patent application Ser. No. 126,407 filed on Nov. 27, 1987. The previous method involves processing two images of an object, the images being acquired with different camera settings. The camera setting differs in any of the three camera parameters: (i) position of the image detector, (ii) focal length of the camera system, and (iii) diameter of the camera's aperture. Two constraints, which are mathematical expressions (i.e. binding relations), were then formulated. The first constraint was expressed solely in terms of the two observed images, while the second constraint was expressed solely in terms of the known camera parameter values and camera characteristics. These constraints or equations involve two unknowns, one unknown for each of the two images. Equations had then been solved simultaneously, and the distance subsequently determined from the solution of the unknown. However, the unknown corresponding to an image was actually an intermediate parameter, $\sigma$, which characterized the point spread function of the camera system. This intermediate parameter was related to the spread or "blur" of the focused image and was based on an assumption that the point spread function has a fixed or predetermined shape or form which can be represented by a Gaussian expression.

This earlier method characterized the Point Spread Function (PSF) by a single intermediate parameter, $\sigma$, which is the standard deviation of the PSF. This is an inadequate characterization in the presence of diffraction and lens aberrations. The previous system set forth by the inventor in his copending application requires that means be provided in the camera system for measuring the camera parameters. The previous system does not consider the spectral content of the light as a parameter. Moreover, the previous system does not provide for performing uncertainty analysis or error propagation analysis during processing, nor was it applicable to every linear shift-invariant system for estimating a number of system parameters.

It is, therefore, an object of the present invention to provide a depth-from-focusing approach which involves the acquisition and processing of only two images.

It is also an object of the present invention to eliminate the correspondence problem associated with stereo-vision techniques.

It is yet a further object of the present invention to provide an approach which is applicable to all linear shift-variant systems.

Yet another object of the present invention is to provide a simpler and less expensive apparatus for the processing of two images to determine both object distance and camera parameters.

Another object of the present invention is to eliminate the need for an intermediate parameter to characterize the Point Spread Function of the camera system. Another object of the present invention is to eliminate the need for quantitatively measuring the parameters in the camera apparatus.

Another object of the present invention is to provide the means for a single calculation or process step to determine the distance of objects, the optical transfer function, and/or camera parameter values.

An additional object of the present invention is to provide a means for considering the spectral content of the light as it relates to the camera parameters.

Another object of the present invention is to provide rapid autofocusing of electronic cameras, and obtaining improved-focus images from blurred images.

Another object of the present invention is a method for estimating system parameters and recovering input signal in any instrument that can be modeled as a linear shift-invariant system, i.e., a system that performs convolution operation.

Other objects will be known from the present disclosure and it is not intended to be in any way limited by setting forth some of the objects of the present invention.

SUMMARY OF THE INVENTION

The present invention is a process and apparatus for determining the distance of a surface patch of an object from a camera system, focusing the camera system as a result of the determination of the distance, determining camera system parameters, and obtaining improved focus image of a surface patch from its respective blurred image. This invention includes a camera system having an image detector such as CCD array, photographic film, etc., which records the image. The camera has an aperture through which light enters the camera system from the scene, a light filter which allows a known spectrum (or color) of light to pass through and form an image on the image detector, and an image forming optical system having lenses or mirrors or both. The image forming optical system includes a first and second principal plane and focal length, the second principal plane being closer to the image detector than the first principal plane.

The image formation process of the camera system depends on at least one, and possibly more, of the following camera parameters: (i) the distance between the second principal plane and the image detector, (s), (ii) the diameter (D) of the camera aperture, (iii) the focal length (f) of the image forming optical system, and (iv) the spectral characteristics ($\lambda$) of light entering the camera system.

The camera system provides means for varying the value of at least one, and possibly more, and even all, of the camera parameters. This feature is used to change the camera setting by varying the value of at least one, and possibly more, and even all, of the camera parameters. The method of the present invention involves processing at least two, and possibly more, images of a surface patch of an object acquired with different camera settings to find the distance of the surface patch from the camera system.

In a preferred embodiment, the image processing computer further includes a memory space in which a table of values characterizing the camera system is prestored. This table is used to find the distance of the surface patch. The computer can further include a special purpose VLSI computer processing hardware which searches for a set of given values in the prestored table. As an alternative to this hardware for table searching, the computer may include a special purpose VLSI computer processing hardware for computing a correlation measure between a set of given values and the prestored table of values, and for determining the position in the table that results in maximum correlation. The position in the table where the search succeeds or where the correlation is maximum gives the distance of the surface patch.

Also, in a preferred embodiment of the camera system, the effective camera aperture is provided by an aperture stop placed at the front of and close to the image forming optical system, whereby the entrance pupil of the camera system remains the same for all objects in the field-of-view of the camera system. The means for changing the camera parameters of the camera system is provided in a manner such that position of the entrance pupil of the camera system remains unchanged when one or more camera parameters are changed. This helps to avoid the correspondence problem encountered in stereo-vision.

An alternative embodiment of the camera system is obtained by a minor modification of the preferred embodiment described above. In this modified embodiment, instead of using a single camera system which provides means for changing at least one, and possibly more, of said camera parameters, multiple cameras are used. These multiple cameras are such that the camera parameter values of each individual camera differs in at least one, and possibly more, and even all, of the camera parameters. That is, no two cameras among the multiple cameras have identical camera parameter values for all camera parameters. In this apparatus, there is no necessity to provide for varying any of the camera parameters of the individual cameras. All camera parameters of each camera can be fixed, thus avoiding the necessity for any moving parts in the camera system. Therefore the apparatus can be made rugged. Each camera is used to acquire one image corresponding to one set of the values of camera parameters. Each of the individual cameras view the scene through a common aperture with the aid of a beam-splitting arrangement. Except for the above differences, the alternative embodiment is similar to the preferred embodiment.

The method of the present invention includes setting a camera to a first set of camera parameters including at least one of (i) the distance between the second principal plane and the image detector (s), (ii) the diameter (D) of the camera aperture, (iii) the focal length (f) of the camera system, and (iv) spectral characteristics ($\lambda$) of the light transmitted by the light filter. These set of camera parameters can be expressed as a single vector ($e_a$) as set forth below:

$$e_{a1} = \{s_1, f_1, D_1, \lambda_1\}.$$

Next a first image of the surface patch is formed on the image detector. This can be accomplished, for example, by surveying the scene in a field-of-view of the camera system and selecting a surface patch specified by a square field having a center at $(\theta_0, \phi_0)$ and having corner points at $(\theta_i, \phi_i)$ for i=1,2,3,4. The first image can be extracted from the image detector by converting it to a first set of values for processing in the image processing system. This processing can be accomplished in real time simultaneously with processing of other image values or can be stored for later processing.

Next, the camera is set to a second camera setting expressed as set forth below:

$$e_{a2} = \{s_2, f_2, D_2, \lambda_2\}$$

such that $e_{a1}$ does not equal $e_{a2}$. This can be done by merely changing at least one of the camera parameters, such as, for example, the distance s.

Next, a second image of the same surface patch is formed on the image detector. This is then converted to a set of values for processing in the image processing system.

Whether done simultaneously or in series, each of the sets of the values are processed and converted to normalized image values related to the Point Spread Function of the camera system by a convolution operation.

The theoretical underpinnings of the present invention is expressed by carrying out preprocessing operations on the recorded image. These preprocessing operations decouple (or separate) the effects of (i) the focused image of a surface patch in the scene, (ii) the over-all brightness of the surface patch, and (iii) the distance of the surface patch, and the camera specified by a set of camera parameters. Having decoupled the effects of these three factors on the image of a surface patch, the effects of (i) the focused image and (ii) the over-all brightness are cancelled by comparing two images of the same surface patch obtained with different camera settings. This operation gives rise to a single constraint on the distance of the surface patch. This constraint can be solved either analytically or using a prestored table in computer memory provided in the image processor to obtain the distance of the surface patch.

In order to decouple the effects as described above, the "focused image" of the surface patch has been defined in terms of the light energy incident on the entrance pupil of the camera system from points on the surface patch along different directions of view, but independent of actual distance of the surface patch. For example, the brightness of the focused image of a surface patch along a given direction can be defined as proportional to the total light energy per unit time incident on the entrance pupil of the camera system from the object point on the surface patch along the given direction. This definition of focused image is different from that found in the literature. It has been defined uniquely here in terms of the energy incident on the entrance pupil rather than the brightness or radiance of the object points on the surface patch. This unique definition is necessary to decouple the effects of actual distance of the surface patch and its focused image. Consequently, this definition is useful for providing an exact theoretical basis for preprocessing the signal. Moreover, further development of signal processing can be performed from a sound theoretical basis.

Once again in accordance with the theory of the present invention, the image formation process in the camera system is characterized by defining the term "normalized focus image" of the surface patch only in terms of the focused image as defined above, but independent of actual values of any camera parameters. Thus, the normalized focus image is defined as the focused image with unit average brightness and unit magnification. This definition decouples the effect of (i) the over-all brightness of the surface patch (because the average brightness is fixed to be one unit), (ii) the camera parameter values, and (iii) the focused image of the surface patch.

On this theoretical basis, the preprocessing operation is performed to obtain a simple relation between a preprocessed image and the normalized focused image defined earlier in terms of camera parameter values. For example, in the preferred embodiment of the present invention, one or more of the following operations are included:

(i) correcting for the sensor response characteristics of said image detector, (ii) correcting for non-uniform light transmission of the image forming system.

(iii) magnification normalization involving interpolation and resampling of the first and second recorded images, and (iv) normalizing the brightness of the first and second recorded images.

The present invention evokes a relation established between a suitably preprocessed image (as defined above) of the same surface patch in terms of camera parameters by convolving the normalized focused image of the surface patch with a characteristic Point Spread Function. This is referred to as the "convolution relation". The Point Spread Function, in turn, is determined by the actual values of the camera parameters and the distance of the surface patch, but does not depend on the focus image of the surface patch. Thus, the image formation process is characterized in terms of a set of camera parameters. In the convolution relation the normalized focus image contains only the photometric information about the surface patch, and the Point Spread Function contains geometric information (i.e., information regarding distance) of the surface patch and camera information (i.e., information about the parameters).

In the Fourier domain, the convolution relation is expressed as the Fourier transform of the preprocessed image being equal to the product of the Optical Transfer Function of the camera system, $H(\omega,v;e_1,r_0)$, and the Fourier transform $F_n(\omega,v)$ of the normalized focused image of the surface patch. The optical transfer function is the Fourier transform of the camera's point spread function $h(x,y;e_a,r_0)$. The optical transfer function, therefore, is determined and dependent on the camera parameters and the distance of the surface patch. An analytic expression can be derived for the optical transfer function from a theoretical model of the image formation theory in the camera system. For example, an image formation theory based on the principles of paraxial geometric optics, or diffraction optics can be used.

The relation obtained above between a suitably preprocessed image and the normalized focused image is used to specify a relation between two images. One image is the result of first recording an image in the specified field of view by setting the camera system to the first camera setting and then processing the image thus recorded according to the preprocessing operations specified for the first camera setting. The other image is the result of recording an image in the same field of view by setting the camera system to said second camera setting and then processing the image thus recorded according to the preprocessing operations specified for the second camera setting. This relation between the two images is expressed for all possible distances of the surface patch, directly in terms of the first camera setting and the second camera setting. No intermediate parameters are used in this relation. Further, this relation is expressed independent of appearance or focused image of the surface patch. In fact since the normalized focused image should be the same for all distances, the term corresponding to the normalized focused image in the relation derived earlier between a suitable preprocessed image and the normalized focused image is eliminated. This relation facilitates the determination of the distance of the surface patch in a computationally efficient manner by solving a single constraint even in the presence of significant optical aberrations using camera systems having arbitrary point spread functions without actually measuring the camera parameters and without introducing unnecessary restrictions, approximations and intermediate parameters.

A specific example of the relation specified by the previous paragraph can be obtained as follows. Record the first image of the surface patch for a first potion of the image detector, move the image detector to a new position while keeping everything else (i.e. all other camera parameters) the same, and record a second image of the surface patch. Preprocess the first and the second recorded images and take the ratio of their Fourier transformations, i.e.

$$\frac{G_{n1}(\omega,v)}{G_{n2}(\omega,v)} = \frac{H(\omega,v;e_{a1},r_0) F_n(\omega,v)}{H(\omega,v;e_{a2},r_0) F_n(\omega,v)}.$$

This gives a relation that equates the ratio of the Fourier transforms of the two preprocessed images to the ratio of the corresponding optical transfer functions.

In the ratio relation derived above, the Fourier transform of the normalized focused image cancels out. Therefore, at any give Fourier spatial frequency, the value of the ratio depends on the distance of said surface patch but not on the normalized focused image. This ratio can be expressed as a function of the distance of the surface patch in the form of an analytic equation, e.g., $$\frac{G_{n1}(\omega,v)}{G_{n2}(\omega,v)} = \frac{H(\omega,v;e_{a1},r_0)}{H(\omega,v;e_{a2},r_0)},$$

or tabulated and stored in computer memory for all possible distances of the object. The analytic expression can be derived from a theoretical model of the camera system. For example, the analytic expression can be derived based on the principles of geometric optics, or diffraction optics. This analytic expression can be used to determine the distance of the surface patch.

The ratio relation obtained above can also be represented as a prestored table of values in computer memory. This table can then be used to determine the distance of the surface patch. The table itself can be computed from a theoretical model of the camera system. The table can also be determined experimentally by a calibration procedure.

The steps until now belong to the first major step of the method of determining the distance of a surface patch. The second major step comprises the following steps.

Record a first image of the surface patch by setting the camera system to the first camera setting. Preprocess the image thus recorded according to the corresponding operations specified for the first camera setting.

Record a second image of the surface patch by setting the camera system to the second camera setting. Preprocess the image thus recorded according to the corresponding operations specified for the second camera setting.

Now use the first image, the second image, and the relation specified earlier between two images such as the first and second images to determine the distance of the surface patch. The relation used in this step is the one specified earlier between two images. One image is the result of first recording an image in the specified field of view by setting the camera system to the first camera setting and then processing the image thus recorded according to the preprocessing operations specified for the first camera setting. The other image is the result of first recording another image in the same field of view by setting the camera system to the second camera setting and then processing the image thus recorded according to the preprocessing operations specified for the second camera setting.

In addition to a method for finding the distance of a surface patch, the present invention also provides an expression to determine the uncertainty in the distance of the surface patch determined by the method outlined above. This expression involves the optical transfer function of the camera system, the uncertainty in the measurement of camera parameter values, and the uncertainty in the measurement of image signal expressed as signal to noise ratio.

The accuracy of the above method for determining distance can be enhanced by reducing the effects of blur seeping across the borders of the image of the surface patch (the image-overlap problem). The region surrounding the border of the surface patch is kept dark by not illuminating the region. This avoids the overlapping of blur produced by surface patches adjacent to the surface patch with the blur produced by the surface patch. Hence the accuracy of the distance computed improves.

If the image of a surface patch whose distance is desired does not exhibit reflectance variation, then brightness variation can be introduced by projecting a light pattern onto the surface patch in the scene. This facilitates the determination of distance of the surface patch.

In principle, acquiring and processing just two images of a surface patch are sufficient to determine the distance of the surface patch. However, a more robust estimate of the distance can be obtained by processing several distinct pairs of images of the surface patch. Each distinct pair of images is processed to obtain one independent estimate of distance. A weighted average of all the independent estimates of distances yields a robust estimate of distance. In general, the distance of the surface patch estimated by the above described method can be combined with other independent distance estimates (obtained by either the same method or a different method) by taking a weighted average to obtain a more robust estimate of the distance.

Another feature of the present invention is a method for rapidly autofocusing a surface patch on the image detector of the camera system using the distance determined between the camera system and the surface patch. In addition to the steps for determining the distance, this method includes two more steps. First, on the basis of the distance of the surface patch, determine values of at least one and possibly both of the camera parameters: (1) the focal length of the image forming optical system of the camera system and (2) the distance of the image detector from the second principal plane, which brings the surface patch into focus. The determination of these two parameters is down using an image focusing formula. An example of the image focusing formula is the well-known lens formula: $1/f = 1/u + 1/v$ which is based on the principles of paraxial geometric optics.

The next step in autofocusing is to set the values of the focal length and the distance of the image detector from the second principal plane to the values determined in the previous step. This accomplishes autofocusing.

A further embodiment of the present invention is to facilitate determining in parallel (i.e. simultaneously) the distance of all surface patches of objects in the scene, irrespective of whether any surface patch is in focus or not, and irrespective of their distances from the camera system, from only two images. Pairs of images corresponding to each surface patch in the scene are processed simultaneously in parallel to determine their distances from the camera system. This is accomplished by dividing the complete field-of-view of the camera system into many smaller subfield-of-views and repeating the steps of the method of determining distance of a surface patch for each subfield-of-view, thereby determining the distances of surface patches in each subfield-of-view from the camera system.

The present invention is also used to determine improved-focus image of a surface patch from a pair of possibly blurred images recorded with different camera settings. First the distance of the surface patch is determined by using the method outlined earlier. Based on this distance, the optical transfer function of one of the recorded and preprocessed image of the surface patch, say the first image, is determined. The Fourier transform of the first image is then determined. This Fourier transform is divided (deconvolution) by the optical transfer function determined above. By computing the inverse Fourier transform of the result of the division above, an improved-focus image of the surface patch is obtained.

Consequently, an improved focus image of the entire visible scene can be obtained from a pair of images, irrespective of distance of the visible surface patches in the scene from the camera system. This method includes the steps of dividing the complete field-of-view of the camera system into many smaller subfield-of-views and repeating steps of the method of determining the improved-focus image of a surface patch for each subfield-of-view, thereby determining the improved focus images of surface patches in each subfield-of-view. The improved-focus images thus determined are then synthesized (or combined) to obtain an improved focus image of the entire scene in the complete field-of-view of the camera system.

The present invention also includes an apparatus for determining the distance between a surface patch of an object from a camera system which includes an image detector, a camera aperture, an image forming optical system having first and second principal planes and a focal length, the second principal plane being arranged closer to the image detector than the first principal plane, and a light filter. The camera system also includes a camera controller which is operatively connected to the parts of the camera system for movement to change one or more of the following camera parameters: i) the distance between the second principal plane and the image detector, ii) the diameter of the camera aperture, and iii) the focal length of the image forming optical system. Finally the camera system also includes an image processor which is operatively connected to the image detector and to the camera controller for receipt of signals from the image detector and for varying the camera parameters by means of a camera controller.

In a preferred embodiment, the image processor includes means which convert the signal from the image detector to digital data and normalizes the resulting digital image for further image processing. In yet a further preferred embodiment, a preprocesor can include at least one of a means for correcting the sensor-response characteristic of the image, means for correcting non-uniform light transmission of the image forming optical system, means for normalizing the brightness of the images, and means for normalizing magnification of the images recorded on the image detector.

The image processor can also include a Fourier transformer of signals and a divider for dividing Fourier coefficients to provide a set of ratio values corresponding to signals from a first and a second image. This latter embodiment can also include a means for substituting ratio values gathered from the first and second images into a mathematical relationship to provide the distance of the surface patch from the camera system. Yet another embodiment includes a look-up table and a correlation means to determine the distances of the object or objects from values obtained from a comparison of the input with values stored in the look-up table.

The present invention provides a method of determining at least one and possibly more unknown system parameters of a linear shift-invariant system, and also recovering the original input signal to the linear shift-invariant system. A linear shift-invariant system is characterized by a system transfer function expressed in terms of a set of known system parameters which specify the physical configuration of the system. The linear shift-invariant system is such that it is capable of providing output signals for different settings of the known system parameter values. The method for determining the unknown system parameters and the original input signal includes:

(a) recording the output signal of the linear shift-invariant system for a number of different settings of the known system parameter values;

(b) formulating a set of equations that relate the Fourier transforms of the recorded output signals to the system transfer function of the linear shift-invariant system;

(c) solving the set of equations derived in step (b) to obtain the unknown system parameters, and (d) computing the original input signal from at least one of the recorded output signal and the known system parameters and the system parameters determined in step (c).

A variation of the above method can be employed which consists of a number of linear shift-invariant systems instead of a single linear shift-invariant system. Each linear shift-invariant system takes a common input signal and gives a distinct output signal depending on its system parameters. The system parameters of each system is distinct. The problem is to determine those system parameters that are unknown and also to determine the common input signal given the output of all the systems. The system transfer function of the linear shift-invariant systems are characterized by the values of the system parameters. This method includes the steps of (a) recording the output signals of the set of linear shift-invariant systems, (b) formulating a set of equations that relate the Fourier transforms of the recorded output signals to the system transfer functions of the set of linear shift-invariant systems, (c) solving the set of equations derived in step (b) to obtain the unknown system parameters, and (d) computing the original input signal from at least one of the recorded output signal and the known system parameters and the system parameters determined in step (c).

As a result of the present invention, several disadvantages realized in the prior art have been overcome. For example, with regard to depth-from-focusing approaches, the present invention requires a processing of only two images. Therefore, it is faster and requires much less in the way of computational resources.

Furthermore as a result of the present invention, not only one, but up to four camera parameters can be varied at a time. Therefore, the present invention is generally more applicable to practical camera systems. Furthermore, the present invention is not restricted to a Gaussian Modulation Transfer Function. It is applicable to arbitrary Modulation Transfer Functions.

Moreover, the present system is applicable to any camera system that can be modeled as a Linear Shift-Invariant System. It is not restricted by the form of the Point Spread Function (PSF) of the camera system. Therefore, it is applicable even in the presence of significant optical aberrations and image distortion caused by diffraction. The PSF of the present system is characterized completely and directly in terms of the relevant camera parameters, thus accounting for diffraction effects and lens aberrations. No intermediate parameters are used to characterize the PSF as was previously used in the inventor's copending application.

Furthermore, it is not required to know the actual values of the camera parameters in order to apply this method if a table has been precomputed by means of experiments at the beginning. Since the present system can avoid the requirement for quantitatively measuring camera parameters, the required camera apparatus can be simpler and cheaper.

As a further result of the present invention, a single equation involving the distance of objects, the optical transfer function and the camera parameter values can be formulated and solved analytically (or through a table lookup method). It eliminates the need to formulate and solve two separate equations simultaneously as was previously thought necessary.

The present invention also takes into account the effect of the spectral content of light entering the camera system by considering it as a separate camera parameter.

The present invention further provides a means for estimating the uncertainty in the measurement of the distance of objects in terms of the image signal quality and uncertainty in the measurement of the camera parameter values. Moreover, it generalizes the method of determining distance and makes it applicable to any Linear Shift-Invariant system for estimating any number of the system parameters and estimating the input signal.

Since the present invention includes four preprocessing steps including sensor response correction, non-uniform transmission correction, magnification normalization, and a gray-level normalization which are essential for theoretical correctness, the system is more accurate for a wide range of variation of the camera parameters.

The correspondence problem previously referred to in the background, is overcome by moving the image detector back and forth while keeping the camera aperture unmoved. This is in contrast to most prior art wherein the image detector is not moved but the lens system is moved thus introducing correspondence problem.

Furthermore, since the present invention does not assume that the Point Spread Function or Optical Transfer Function has a specific form such as a Gaussian or cylindrical function as in the prior art, these functions can have any form which might be encountered in practice, thus making the present system more widely applicable.

Also since most prior art is limited to processing special frequency components, these methods are not applicable when the frequency components are insignificant in the acquired images. To the contrary, the present invention uses all significant frequency components, whether high or low, and it is not restricted to using only one frequency component as in most prior art.

Other advantages include freedom from restrictions on the appearance of the objects or values of the camera parameters as in the prior art. Thus, objects need not contain bright and dark patches with a straight border in between. Neither does the present invention require that one of the images be acquired with a small (pinhole) aperture size.

The present system is not restricted to camera systems whose Point Spread Functions are characterizable by a single parameter. Instead the present invention is characterized directly in terms of all relevant camera parameters. Therefore, the method of this invention is applicable even in the presence of significant diffraction and aberrations. All known prior art lacks this generality.

The present invention also provides a single constraint as opposed to two or more required in the prior, thus reducing the computational cost of solving the constraint. This constraint is expressed directly in terms of the observed images and the camera parameters. No intermediate parameters (e.g., the standard deviation of the PSF distribution) are involved.

Other and further advantages of the present invention will become apparent hereinafter to those with ordinary skill in the art, and it is not intended in any way to restrict the scope of the invention by reference to the above-identified advantages.

BRIEF DESCRIPTION OF THE DRAWINGS

For a better understanding of the present invention, reference is made to the following description of the preferred embodiments which is to be taken in connection with the accompanying drawings, wherein.

DETAILED DESCRIPTION OF THE PREFERRED EMBODIMENTS

Camera Apparatus and Camera Parameters

Figure 1:
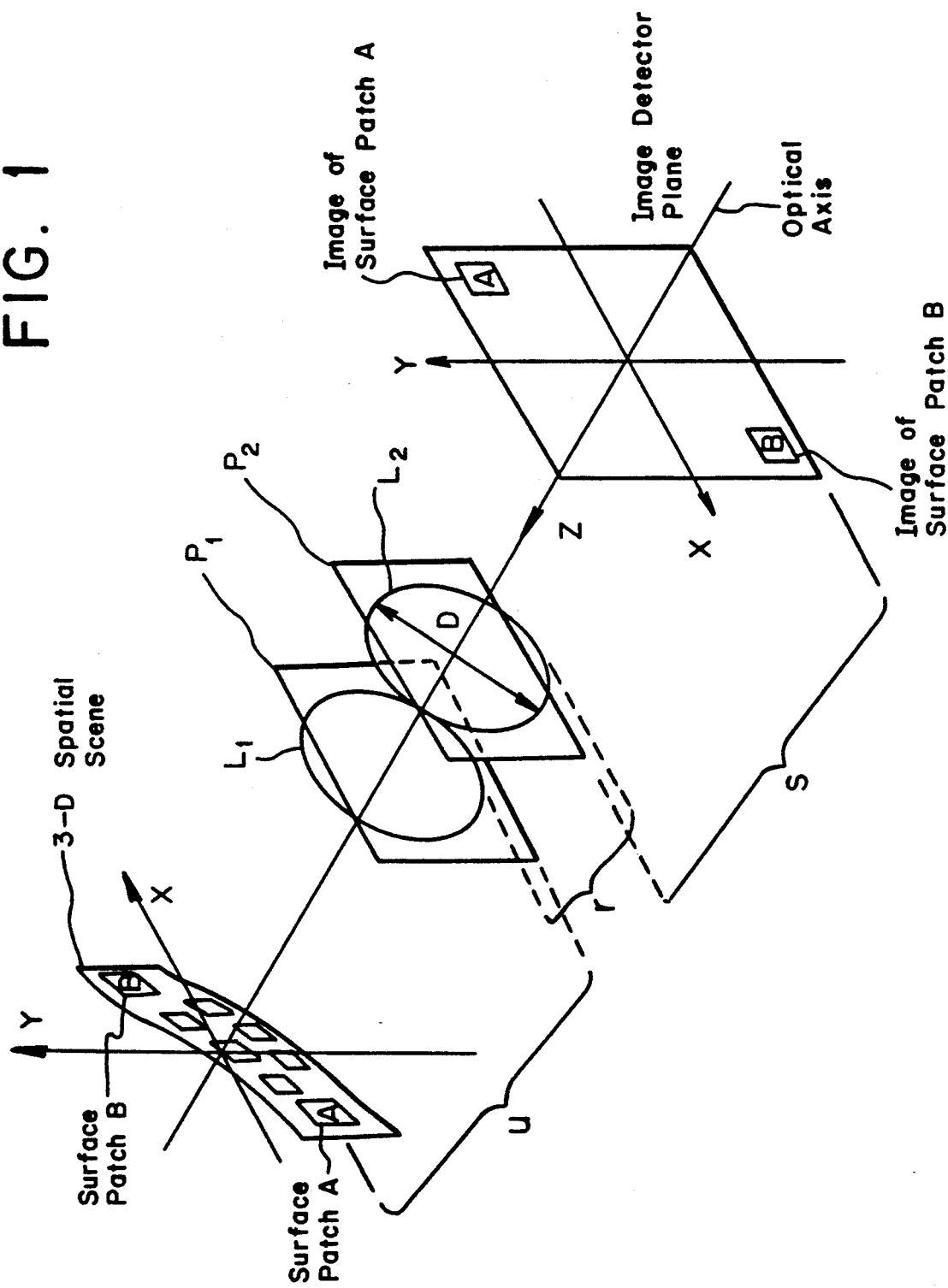
FIG. 1 is a perspective schematic diagram showing a scene and containing two surface patches and a camera system including a lens system and an image detector located along the optical axis thereof, illustrating the camera system geometry and camera parameters.
Figure 2:
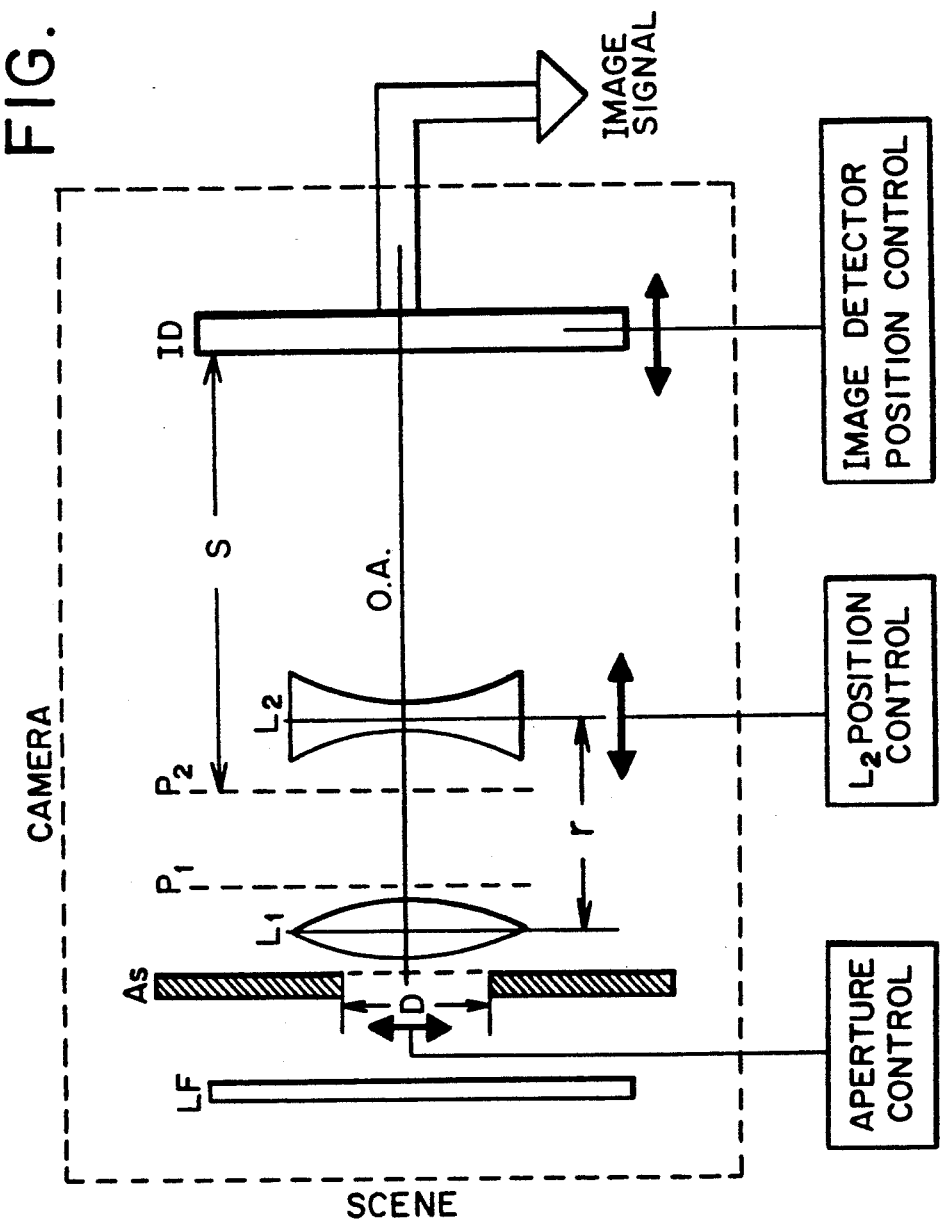
FIG. 2 is a schematic of a camera system illustrating a lens position controller for varying the focal length of the lens system, image detector plane position controller for varying the distance between the image detector plane and the second principal plane of the lens system, a filter to control the spectral content of light entering the camera, and a camera aperture diameter controller for varying the diameter of the camera aperture.

Referring to FIG. 1, a perspective schematic diagram of the camera system of the present invention is shown viewing a three-dimensional spatial scene. FIG. 2 shows the details of the camera system of the preferred embodiment. It includes an optical system having a first lens $L_1$ and a second lens $L_2$ disposed along the common optical axis O.A. to facilitate changing the focal length f of the lens system. The focal length f is a camera parameter.

The lens system is characterized by a first principal plane $P_1$ and a second principal plane $P_2$.

An aperture stop $A_s$ is placed immediately in front of the first lens $L_1$. The diameter of this aperture stop D is a camera parameter. This diameter is variable, but its value is always small enough so that the entrance pupil and the effective aperture of the camera system are always determined by its value (and not by some other stop inside the camera). Placing $A_s$ very close to lens $L_1$ at the front ensures that all objects in the scene experience the same entrance pupil irrespective of their distance from the camera.

In the absence of optical aberrations, it is desirable to have as large an aperture diameter D as possible because (i) it results in a smaller depth of field thus yielding a greater range (or depth) discrimination capability to the camera system, (ii) it provides greater image irradiance, and (iii) it reduces diffraction.

The value of the focal length f of the lens system is changed by translating the lens $L_2$ back and forth along the optical axis. The other lens $L_1$ is preferably not moved so that it stays close to the aperture stop. In particular, the entrance pupil which is determined by the aperture stop should never be moved because such a movement causes the correspondence problem encountered in stereo-vision.

Both lenses $L_1$ and $L_2$ can be convex or one of them can be concave. In either case the effective focal length f is determined from the well-known formula $$\frac{1}{f} = \frac{1}{f_{L1}} + \frac{1}{f_{L2}} - \frac{r}{f_{L1}f_{L2}} \quad (1)$$

where $f_{L1}$ and $f_{L2}$ are the focal lengths of the two lenses $L_1$ and $L_2$ respectively, and r is the distance between the two lenses. A similar formula can be used even if there are more than two lenses (see for example Chapters 5 and 6 in the book titled Optics by Hecht and Zajac, Addison-Wesely Publishers, 1974). The positions of the principal planes $P_1$ and $P_2$ and principal points $Q_1$ and $Q_2$ of the lens system are determined using well-known methods in geometric optics, for example, as discussed in Chapter VII, Section 2 of the text Optics by K. N. Ogle published by Charles C. thomas, Springfield, Ill., in 1968. As an alternative method of changing the effective focal length f by translating lens $L_2$, one or both of the focal length $f_{L1}$, $f_{L2}$ could be changed. This can be done by substituting one lens with another lens having a different focal length.

The camera system also includes an image detector ID on which the actual image is formed and recorded. The distance between the second principal plane $P_2$ of the lens system and the image detector ID is designated as s and constitutes a camera parameter. The value of the camera parameter s can be changed by translating the image detector ID back and forth along the optical axis. The value of s can also be changed by effectively moving the principal plane $P_2$.

Figure 3:
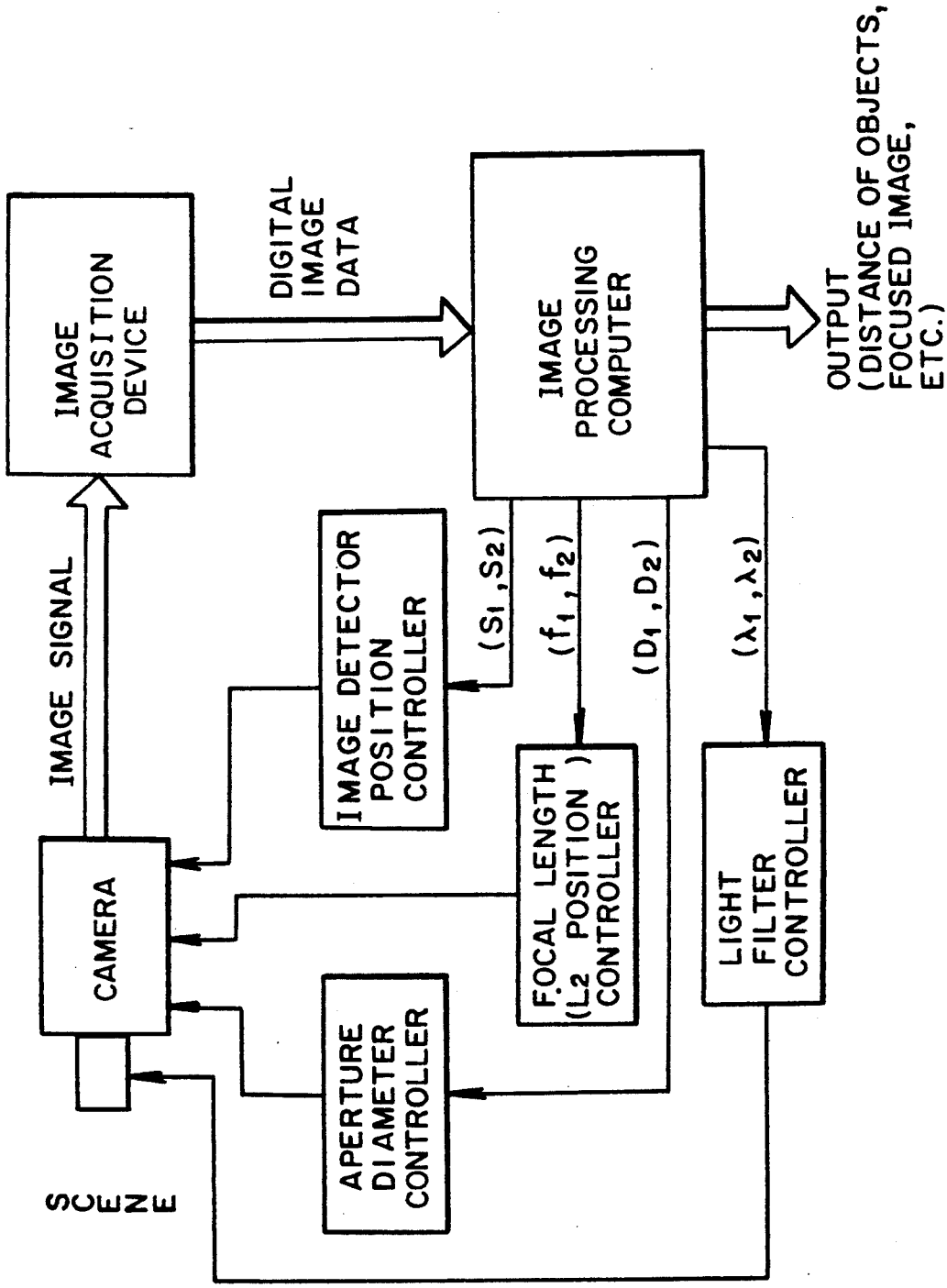
FIG. 3 is a block diagram of the apparatus of FIG. 2, digital image acquisition device, and an image processing computer.

FIG. 3 shows the camera system along with an image acquisition device and an image processing computer. The image acquisition device receives image signal from image detector and converts it to digital form. This digital image is then input to the image processing computer. This computer processes the input digital images to recover the distance of surface patches.

It is not necessary to be able to measure all camera parameters, but this information may sometimes be useful. So the preferred embodiment optionally provides means for quantitatively measuring the value of the camera parameters, including changes in the camera parameter values effected by the means for varying the same.

Figure 15:
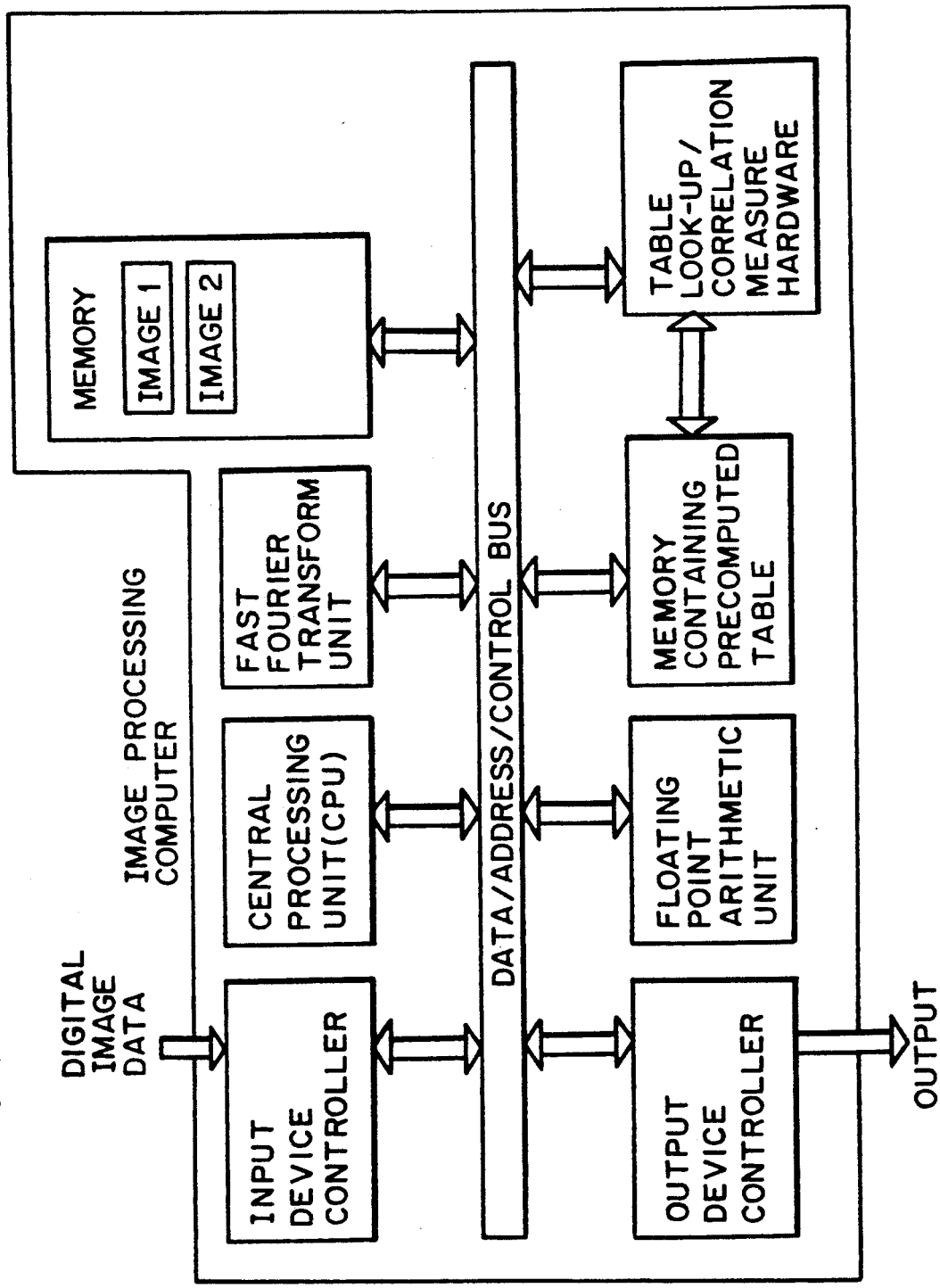
FIG. 15 is a schematic block diagram of the image processing computer showing various modules including a memory module containing a prestored table of values, and a special purpose VLSI chip for fast table look-up operation.

FIG. 15 shows a schematic block diagram of the image processing computer. It consists of several modules that are usually found in Digital Signal Processing applications. An input device controller and an output device controller coordinate data transfer by the input and the output devices. A Central Processing Unit (CPU) assists in preprocessing operations. A Fast Fourier Transform (FFT) chip and Floating Point Arithmetic chip are also included to speed up processing. The main memory stores the input image data and also the intermediate results of processing operations at various stages.

In addition to the modules mentioned above, the image processing computer also contains two modules to determine the distance of surface patches. The first module is a memory module containing a fast Random Access Memory (RAM) or a Read Only Memory (ROM) module which stores a table of precomputed values. This prestored table characterizes the camera system. The second module is a "look-up"/correlation module having special purpose VLSI hardware for fast table searching for a given set of computed values. This module performs either a table look-up operation (which partially involves associative search) or compute a correlation measure and searches for its maximum.

Figure 4:
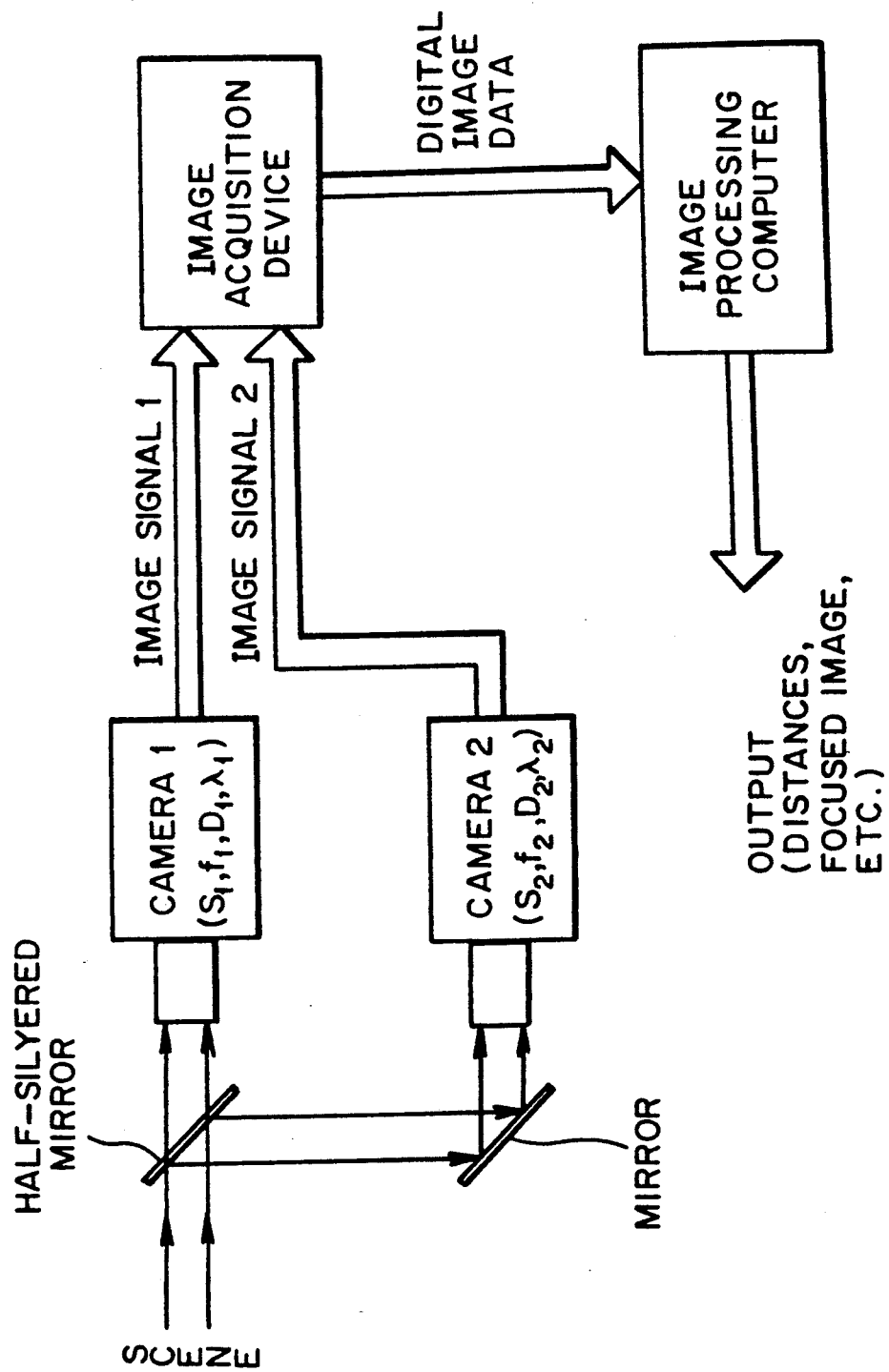
FIG. 4 is a block diagram of an alternative camera system for the apparatus of FIG. 3, having a two camera configuration for simultaneously forming a pair of two-dimensional images of a scene from the same viewing point, with each camera system having a different camera setting.

An alternative to the preferred embodiment is shown in FIG. 4 which can be used to acquire two images of a scene simultaneously. This embodiment is obtained by a minor modification to the preferred embodiment described above. In this modified embodiment, instead of using a single camera system which provides means for changing at least one (and possibly more) of the said camera parameters, multiple cameras are used where the camera parameter values of each individual cameras are dissimilar in at least one (and possibly more, and even all) camera parameter(s). In this application, there is no necessity to provide for varying any of the camera parameters of the individual cameras. Each camera is used in acquiring one image corresponding to one set of values of camera parameters. Each of the individual cameras view the scene through a common aperture with the aid of a beam-splitting arrangement. Except for this, other parts of the embodiment such as the image acquisition device and image processing computer are all similar to the preferred embodiment.

Theoretical Foundations

The theoretical foundations underlying the present invention are explained in this section.

Coordinate Systems and Image Representation

Figure 5:
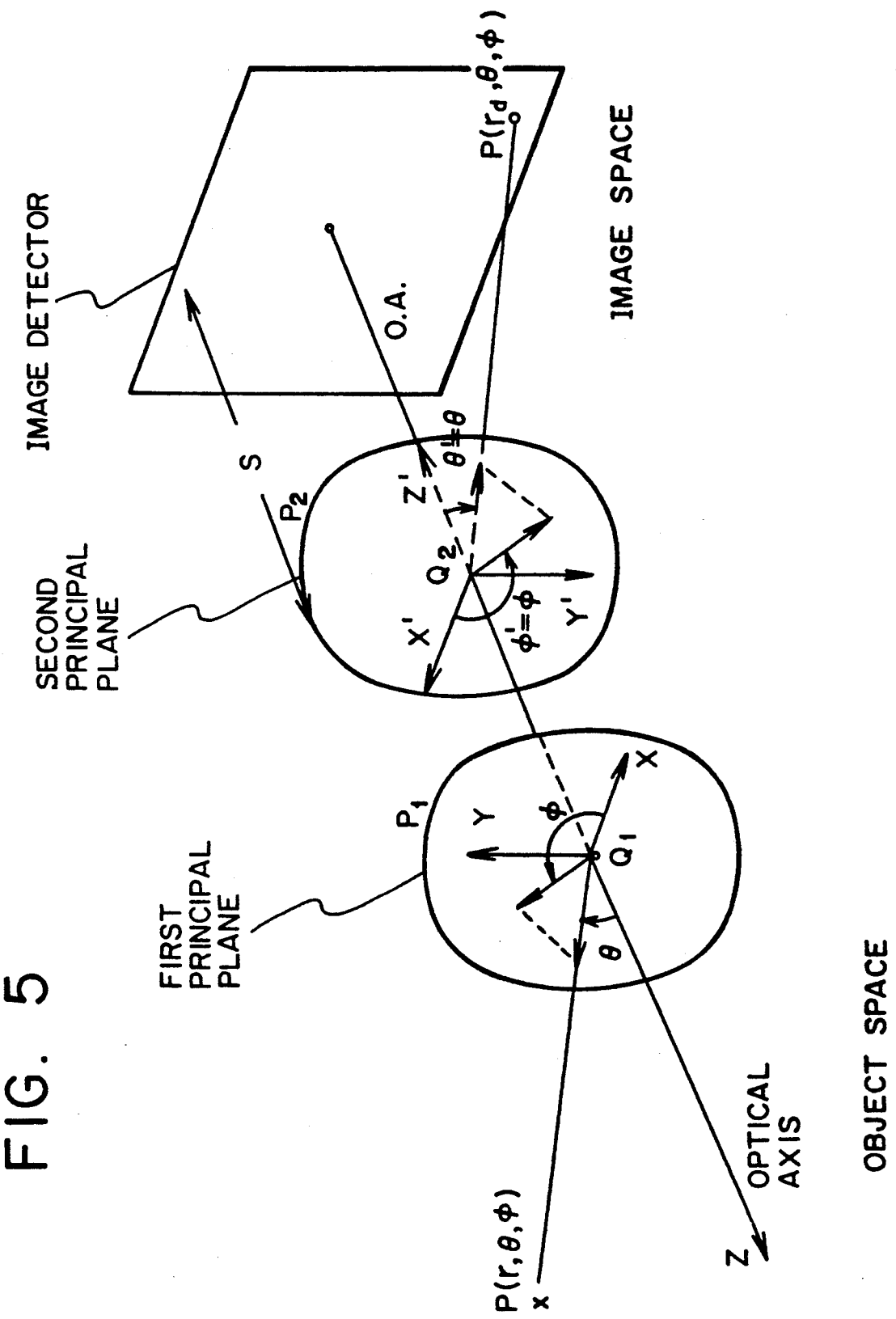
FIG. 5 is a schematic diagram of the spherical coordinate systems used in describing the method of the invention.

FIG. 5 shows two spherical coordinate systems $(r,\theta,\phi)$ and $(r',\theta',\phi')$. The first coordinate system $(r,\theta,\phi)$ is located at the first principal point $Q_1$ and the second coordinate system $(r',\theta',\phi')$ is located at the second principal point $Q_2$. The X and Y axes of both the coordinates lie in the principal planes and the Z axis coincides with the optical axis. In this coordinate system a light ray incident on the first principal plane along the direction $(\theta,\phi)$ emerges from the second principal plane $P_2$ along the direction $(\theta',\phi')$. In the preferred embodiment of the invention, the medium surrounding the optical system is the same everywhere (say air), and the optical system is circularly symmetric about the optical axis. For such a system, the incident ray and the emergent ray are such that $\theta'=\theta$ and $\phi'=\phi$. Therefore, in order to simplify notation, we use only $\theta$ and $\phi$ to specify the direction of both the incident ray and the emergent ray in the following discussion. The present invention can however be easily extended to a more general case where the medium surrounding the optical system is different at different positions and the optical system is not circularly symmetric.

Image coordinate system: The image detector in practice contains an array of photosensitive sensor elements such as CCD sensors arranged on a two-dimensional surface. If $(r_d,\theta,\phi)$ is the set of points lying on the image detector surface, then the surface can be uniquely defined by the function $$r_d(\theta,\phi). \quad (2)$$

The image of a scene formed by the optical system produces an image irradiance distribution on the image detector surface. This irradiance distribution can be expressed in the form of a function as $$g(\theta,\phi). \quad (3)$$

This function represents the image formed on the image detector. Note that $g(\theta,\phi)$ can represent the image for any arbitrary shape of the image detector surface. In particular, the image detector may be planar as in most CCD cameras or it may be curved as for example is the case with the retina of the human eye.

In the preferred embodiment of the present invention, the image detector surface is planar and is perpendicular to the optical axis, located at a distance s from the second principal plane. Therefore the equation of the image detector surface is $$r_d(\theta,\phi) = s/\cos\theta. \qquad (4)$$

It should be noted, however, that the present invention is not limited to any specific geometric shape of the image detector surface, such as, for example, the planar shape. The invention can be extended easily to arbitrary shapes of the image detector surface.

Figure 6:
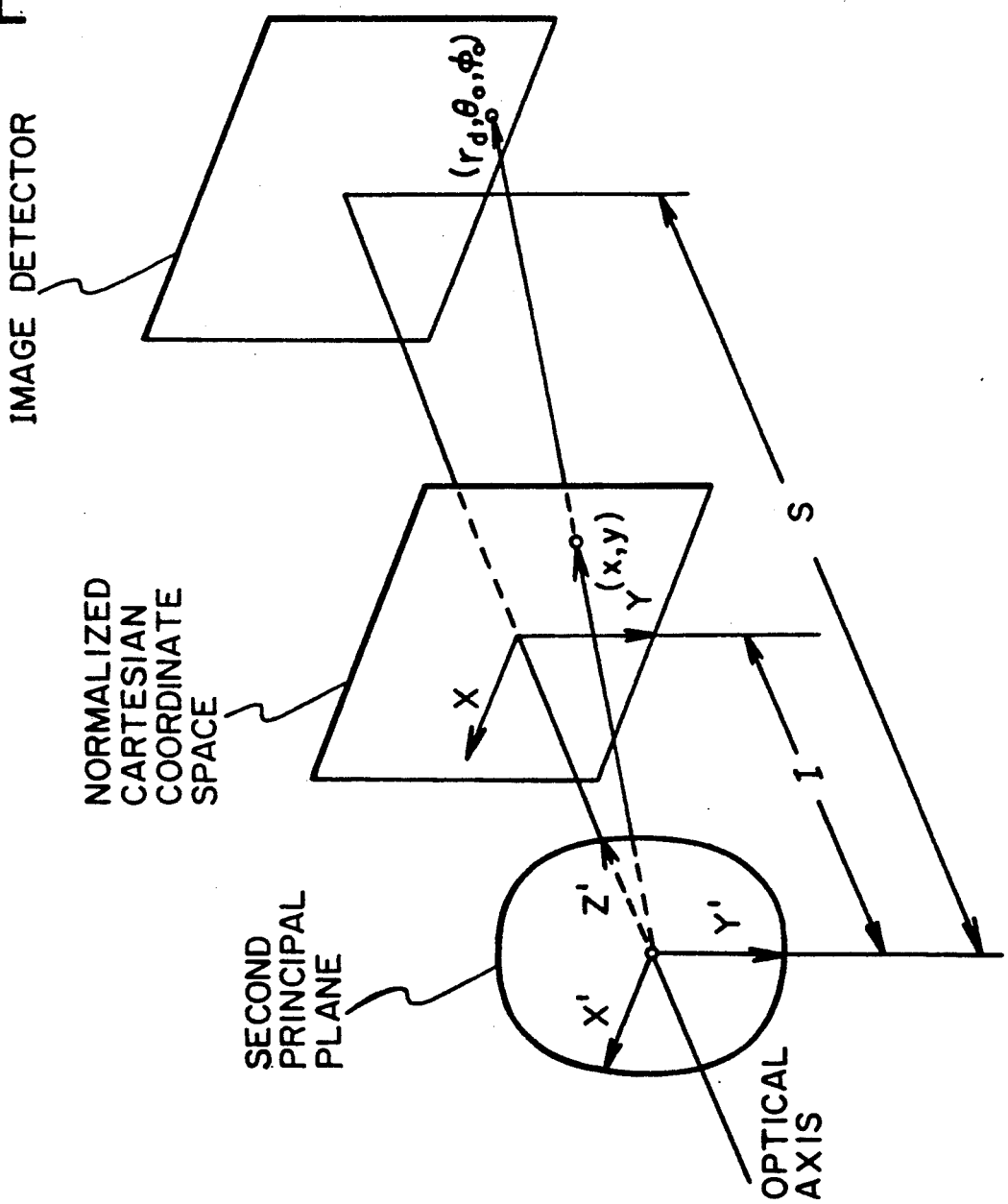
FIG. 6 illustrates schematically the Normalized Cartesian space which is a hypothetical plane at unit distance behind the second principal plane.

The method of the present invention could involve moving the image detector forward or backward along the optical axis. Such a movement of the image detector results in a change in the magnification of the recorded image. In order to take this change in magnification into account, we define a normalized Cartesian coordinate system (x,y) to specify points on the image detector plane. It is a hypothetical Cartesian coordinate system located at unit distance from the second principal plane. See FIG. 6. For any arbitrary point $(s/\cos\theta,\theta,\phi)$ on the image detector, the normalized Cartesian coordinates, x,y of the point are $$x = \tan\theta\cos\phi \text{ and } y = \tan\theta\sin\phi. \qquad (5)$$

Note that the mapping between any direction specified by $(\theta,\phi)$ and the Cartesian coordinates (x,y) defined as above is one to one, that is, given the direction $(\theta,\phi)$ the normalized Cartesian coordinates (x,y) are uniquely determined and vice versa. The inverse relation between them is given by $$\theta = \tan^{-1}\sqrt{x^2 + y^2} \text{ and } 0 \leq \theta < \pi/2, \qquad (6)$$

$$\phi = \cos^{-1}(x/\sqrt{x^2 + y^2}), \qquad (7)$$

$$\phi = \sin^{-1}(y/\sqrt{x^2 + y^2}) \text{ and } 0 \leq \phi \leq 2\pi.$$

Therefore, any image $g(\theta,\phi)$ on the image detector can also be denoted equivalently by $g(x,y)$. We will use $g(\theta,\phi)$ and $g(x,y)$ interchangeably to denote the same image.

Having described the coordinate system and notation, we now define an important term that is fundamental to the present invention.

The focused image $f(\theta,\phi)$ is the total light energy per unit time incident on the entrance pupil of the camera system from the object point located along the direction $(\theta,\phi)$ in the scene.

This definition of the focused image is different from that found in the literature. Here it is defined in terms of the energy incident on the entrance pupil rather than the brightness or radiance of object points in the scene. A definition based on radiance of object points in the scene would make the focused image to be dependent on the distance of the objects in the scene. This is so because, although the light energy incident on the entrance pupil is proportional to the radiance of the object, it decreases inversely with the square of the object distance from the camera system. The new definition decouples the effects of object radiance and its distance from the camera system. This new definition is necessary to represent a correct theory of the present invention.

The definition of the focused image above, although does not depend on the distance of objects, is still dependent on certain camera parameters. For example, it depends on the diameter of the camera aperture because, the incident light energy on the entrance pupil from an object point in the scene is proportional to the solid angle subtended by the aperture at the object point. We next give a definition of brightness normalized focused image such that it is independent of actual values of the camera parameters also.

The brightness normalized focused image $f_n(\theta,\phi)$, is defined as $$f_n(\theta,\phi) = \frac{f(\theta,\phi)}{E} \qquad (8)$$

where E is the total light energy incident on the entrance pupil corresponding to f(x,y). It is computed as $$E = \int\int f(x,y)dxdy. \qquad (9)$$

We will also refer to the 'brightness normalized focused image' as simply the 'normalized focused image'.

Preprocessing Steps of Image Normalization

We next describe a sequence of preprocessing operations on the recorded images so that a simple relation can be derived between the preprocessed images and the normalized focused image in terms of the camera parameter values.

For an ideal camera system, all the light energy incident on the entrance pupil from a point light source along the direction $(\theta,\phi)$ is brought to focus at a point along the same direction $(\theta,\phi)$ behind the lens system and the value of the focused light energy is correctly recorded. That is, there is no energy loss in the camera system due to absorption and other effects such as vignetting. Further, by 'correct recording of the focused light energy' we mean that the response (or the output signal) of the images sensor at location $(\theta,\phi)$ is proportional to the focused light energy $f(\theta,\phi)$. However, a practical camera may not possess this ideal characteristics. Therefore the actual recorded image is preprocessed to correct for this non-ideal behavior of the camera system.

Sensor response correction: The image detector contains an array of photo sensitive sensor elements (for example CCD sensors). The response of these sensor elements is usually proportional to image irradiance. If their response a is not proportional but characterized by a function b=e(a) for incident light energy a, then the correct response a is determined from the observed response b by using the inverse operation $a = e^{-1}(b)$. The inverse function $e^{-1}(b)$ is initially determined through a calibration procedure. Alternatively, the camera manufacturer may provide specifications which relate the response of the image detector to the actual image irradiance. For an observed image $g(\theta,\phi)$, the operation of correcting for the non-linear response of the sensor elements is given by $$g(\theta,\phi) \leftarrow e^{-1}(g(\theta,\phi)), \qquad (10)$$

where the symbol ← means 'becomes'.

Correcting for non-uniform light transmission: The light incident on the entrance pupil is usually attenuated by a small factor by the optical system due to absorption or vignetting effect. The attenuation t usually changes with direction $(\theta,\phi)$. Therefore the attenuation can be characterized in the form of a transmission function $t(\theta,\phi)$. If $g(\theta,\phi)$ is the image formed on the image detector, then the effect of non-uniform light transmission is corrected by the operation $$g(\theta,\phi) \leftarrow g(\theta,\phi)/t(\theta,\phi). \quad (11)$$

An image $g(\theta,\phi)$ (or $g(x,y)$) on which the operations of sensor response correction, and non-uniform transmission correction have been performed is called the observed image of the scene.

Brightness normalization: The total light energy incident from the scene on to the entrance pupil could change due to change in the camera parameters. For example, increase in the diameter of the camera aperture could increases the total incident energy. To take this change into account, the image $g(\theta, \phi)$ is normalized by the total light energy incident on the entrance pupil. The total incident light energy E is computed as $$E = \int\int g(x,y) dx dy. \quad (12)$$

The brightness normalized observed image $g_n(\theta,\phi)$ is defined as $$g_n(\theta,\phi) = \frac{g(\theta,\phi)}{E}. \quad (13)$$

Point Spread Function

The point spread function (PSF), expressed as $h(\theta,\phi)$, of the camera system is defined as the observed image (in the sense defined above) produced by a point light source whose brightness is such that the total light energy per unit time incident on the entrance pupil from the point light source is one unit.

The point spread function $h(\theta,\phi)$ corresponding to a point light source P at position $(r_0,\theta_0,\phi_0)$ depends on the following parameters: (i) the position of the image detector s, (ii) the focal length f of the optical system, (iii) the diameter of the aperture D, (iv) the wave length $\lambda$ (or the spectral content) of light entering the optical system, and (v) the position $(r_0,\theta_0,\phi_0)$ of the light source P. It can also depend on other parameters such as, for example, the degree of coherence of the light incident on the entrance pupil, but these other parameters are considered to remain the same for different images being recorded. However, the present invention can be easily extended to the case where one or more of these other parameters change from one recorded image to another recorded image.

For a circularly symmetric optical system, the point spread function $h(\theta,\phi)$ however does not depend on the angle $\phi_0$. In the preferred embodiment of the invention, the optical system is circularly symmetric around the optical axis. Therefore $\phi_0$ will be dropped from further consideration. However the method of the present invention can be extended to the case where the point spread function does depend on $\phi_0$. It is not limited to circularly symmetric optical systems.

The point spread function depends on the angel $\theta_0$ with respect to the optical axis because of the change in lens aberrations. However, within small intervals of the angle $\theta_0$ the aberrations can be taken to remain approximately the same. Therefore the total field of view of the camera system is divided into many small intervals of $\theta_0$ within which the aberrations are nearly constant. These intervals are of the order of a few degrees. The actual aberrations in each interval can be predetermined through calculations or measurement. The observed image is correspondingly divided into smaller subimages and analyzed separately in each interval. This topic is discussed further later, but for the present the subimage to be processed is considered to lie in one of the intervals of $\theta_0$ inside which the lens aberrations are a constant.

The set of parameters on which the point spread function $h(\theta,\phi)$ depends in the preferred embodiment are: (i) position of the image detector s, (ii) focal length f, (iii) aperture diameter D, (iv) wave length of light $\lambda$, and (v) distance of object $r_0$. We call the first four parameters $(s,f,D,\lambda)$ as camera parameters. We will use a vector $e_a$ to refer collectively to the camera parameters where $$e_a = (s,f,D,\lambda). \quad (14)$$

In order to make explicit the dependence of the point spread function on the value of the vector $e_a$ and the distance $r_0$ of the point light source, we denote the point spread function as $$h(\theta,\phi;e_a,r_0). \quad (15)$$

In this function, all the independent parameters on which the point spread function depends are specified by $e_a$ and $r_0$. These independent parameters are considered to be distinct independent variables of the point spread function h. In particular, the independent parameters are not combined to yield an intermediate blur parameter (e.g. $\sigma$) and take it as the independent variable of the function h.

From the definition of the point spread function, it follows that $$\int_{-\infty}^{\infty}\int_{-\infty}^{\infty} h(x,y; e_a,r_0) dx\, dy = 1. \quad (16)$$

In particular, the above relation holds good for all possible values of the vector $e_a$ and distance $r_0$.

If the observed image $h(x,y; e_a,r_0)$ of a point light source P located at $(r_0,\theta_0,\phi_0)$ is given, then an estimate of the direction $(\theta_0,\phi_0)$ of the point P can be obtained from the center of mass of the image brightness distribution. The position $(\bar{x},\bar{y})$ of the center of mass in the normalized Cartesian coordinate system is given by $$\bar{x} = \int_{-\infty}^{\infty}\int_{-\infty}^{\infty} x\, h(x,y; e_a,r_0) dx\, dy, \quad (17a)$$

$$\bar{y} = \int_{-\infty}^{\infty}\int_{-\infty}^{\infty} y\, h(x,y; e_a,r_0) dx\, dy. \quad (17b)$$

The direction $(\theta_0,\phi_0)$ of point P is then obtained from $(\bar{x},\bar{y})$ using relations (6) and (7).

The spread $\sigma$ of the point spread function can be defined as the standard deviation of the distribution of the point spread function, i.e.

$$\sigma^2 = \int_{-\infty}^{\infty} \int_{-\infty}^{\infty} [(x-\bar{x})^2 + (y-\bar{y})^2] h(x,y;e_a,r_0) dx\, dy. \quad (18)$$

The PSF $h(x,y;e_a,r_0)$ has significant values only in a very small region around its center of mass. This region extends up to a radius of about two or three times the spread $\sigma$. Outside this region the PSF has values very close to zero and hence is insignificant.

The Image of a Surface Patch

Figure 7:
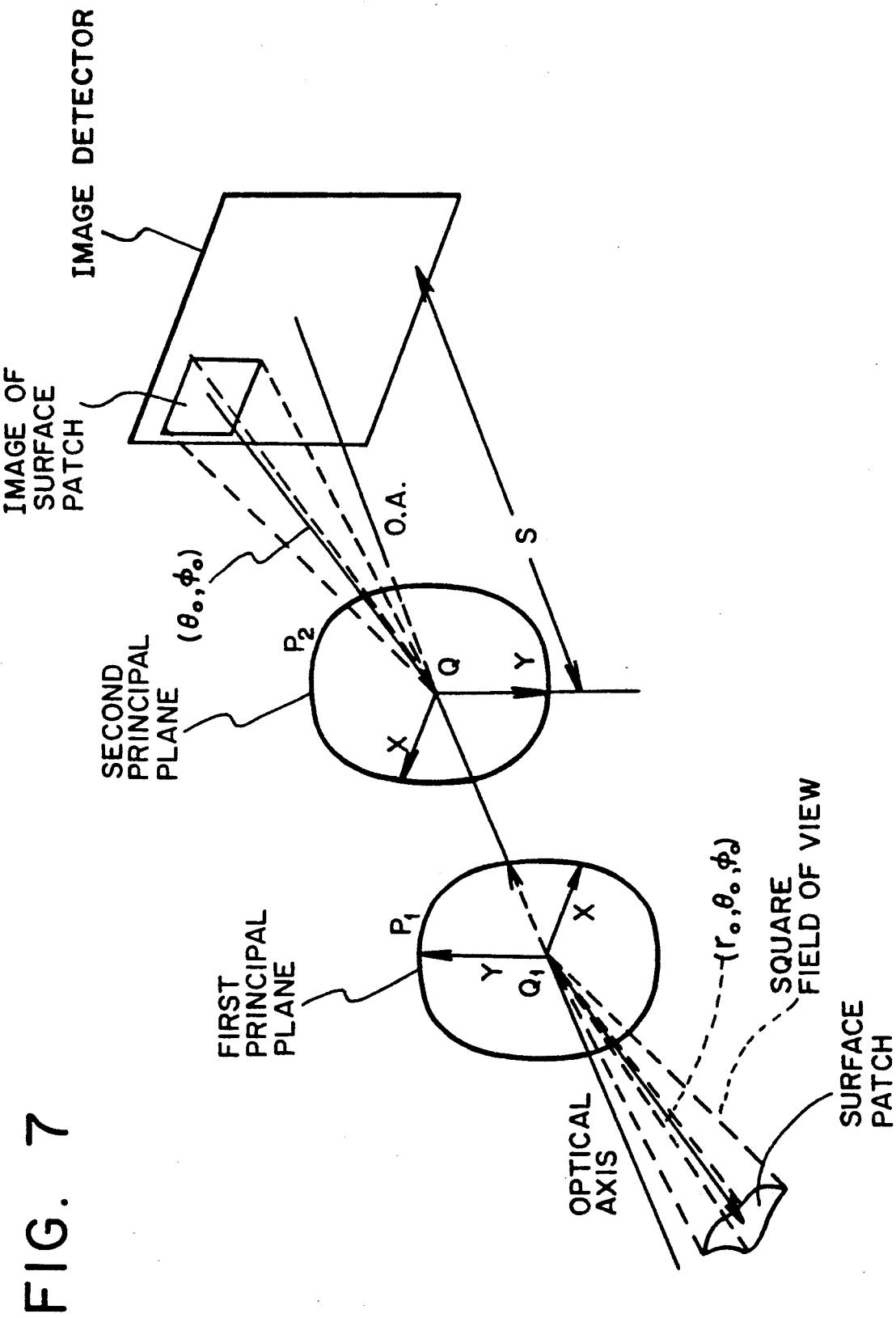
FIG. 7 shows a surface patch in the scene and its corresponding subimage on the image detector.

An object in the scene located at position $(r_0,\theta_0,\phi_0)$ produces an image on the image detector. See FIG. 7. The position $(r_0,\theta_0,\phi_0)$ here in fact represents the position of the center point (say the center of mass) of a surface patch on the object. The direction $(\theta,\phi)$ of every point on the surface patch is trivially determined exactly because the direction of a point in the scene is the same as the direction of its image on the image detector. However the distance $r_0$ of the surface patch from the camera system remains to be determined. The size of the surface patch is taken to be such that the point spread function is nearly the same for all points on the surface patch. This implies that (i) all points on the surface patch are approximately at the same distance $r_0$ from the camera system, and (ii) the aberrations of the optical system are approximately constant for all points on the surface patch. In the image domain, the size of the image of the surface patch should be much larger than the spread $\sigma$ of the corresponding point spread function. Initially, other surface patches surrounding the surface patch under consideration will be treated as non-existent, or are dark, or are not illuminated. Their effect in other cases will be considered later.

In the preferred embodiment of the present invention, without loss of generality, the surface patch in the scene that is of interest is taken to be such that it subtends a solid angle at the first principal point $Q_1$ having a square cross section parallel to the image detector plane. We refer to this solid angel as the field of view corresponding to the surface path. The center of this field of view is given by $(\theta_0,\phi_0)$ and we will designate the corners of the field of view by the directions $(\theta_1,\phi_1)$, $(\theta_2,\phi_2)$, $(\theta_3,\phi_3)$, and $(\theta_4,\phi_4)$, in counter-clockwise direction. Equivalently, the center and the four corners of the field of view corresponding to the surface patch can be specified in the normalized Cartesian coordinates by the points $(x_0,y_0)$, $(x_1,y_1)$, $(x_2,y_2)$, $(x_3,y_3)$, and $(x_4,y_4)$, respectively. The four corner points $(x_i,y_i)$ for $i=1,2,3,4$, specify a square region in the normalized Cartesian coordinate space. Referring to the center point $(x_0,y_0)$ as the direction of the surface patch, and the width of the square region (given by $|x_i - x_{i+1}|$) as the size of the surface patch. The direction and the size of the surface patch are given as input to the method of the present invention.

The image of the surface patch recorded by the camera system is first preprocessed for sensor response correction (according to equation (10)) and then non-uniform light transmission (according to equation (11)). The resulting image $g(\theta,\phi)$ is referred to as the observed image of the surface patch.

Under the situation explained above, as far a the image of the surface patch under consideration is concerned, the camera system essentially acts as a linear shift-invariant system. In fact the primary goal of the discussion in the last few pages has been to lay a theoretical framework in which the camera system can be modeled as a linear shift-invariant system. It is to this end that the steps of sensor response correction and non-uniform transmission have been introduced. For some camera systems, depending on their design and characteristics, some of these preprocessing steps and restrictions may be necessary, for example when the response characteristics are different for different sensor elements on the image detector. In the following discussion, all and only the necessary preprocessing steps will be taken to have been carried out and, all and only the necessary restrictions are taken to be satisfied. In summary, the camera system will be taken to be adequately modeled by a linear shift-invariant system for small surface patches of objects in the scene.

For a camera system that is modeled as a linear shift-invariant system, the observed image $g(\theta,\phi)$ of the surface patch is in fact the result of convolving the corresponding focused image $f(\theta,\phi)$ with the point spread function $h(\theta,\phi;e_a,r_0)$ of the camera system. This relation is expressed as $$g(\theta,\phi) = h(\theta,\phi;e_a,r_0) * f(\theta,\phi), \quad (19)$$

where * denotes the convolution operation. This same relation holds for the brightness normalized images $g_n(\theta,\phi)$ and $f_n(\theta,\phi)$, that is $$g_n(\theta,\phi) = h(\theta,\phi;e_a,r_0) * f_n(\theta,\phi). \quad (20)$$

Note that the above relation is derived from the fact that $$E = \int\int g(x,y) dx\, dy = \int\int f(x,y) dx\, dy. \quad (2)$$

The above equation is a consequence of the conversation of light energy (see equation 16).

Relation (20) can be expressed equivalently in the normalized Cartesian coordinate space as $$g_n(x,y) = h(x,y;e_a,r_0) * f_n(x,y). \quad (22)$$

Equation (22) above relates a suitably preprocessed recorded image $g(x,y)$ of a surface patch with the normalized focused image $f_n(x,y)$ of the same surface patch in terms of the camera parameters nd the distance of the surface patch. The camera parameters and the distance of the surface patch together determine the point spread function $h(x,y;e_a r_0)$.

Taking the Fourier transform of equation (22) gives the following relation:

$$G_n(\omega,\nu) = H(\omega,\theta;e_a,r_0) F_n(\omega,\nu), \quad (23)$$

where $\omega,\nu$ are the spatial frequencies, $G_n(\omega,\nu)$ is the Fourier transform of the brightness normalized observed image $g_n(x,y)$, $H(\omega,\nu;e_a,r_0)$ is the Fourier transform of the PSF $h(x,y;e_a,r_0)$ and $F_n(\omega,\nu)$ is the Fourier transform of the brightness normalized focused image $f_n(x,y)$. $H(\omega,\nu;e_a r_0)$ is called the Optical Transfer Function or OTF of the camera system.

Determining Distance

A first observed image $g_1(x,y)$ of the surface patch is obtained with the camera parameters set to the first set of values denoted by $e_{a1}$ where $$e_{a1} = (s_1, f_1, D_1, \lambda_1). \quad (24)$$

A second observed image $g_2(x,y)$ of the surface patch is obtained with the camera parameters set to the second set of values denoted by $e_{a2}$ where $$e_{a2} = (s_2, f_2, D_2, \nu_2). \quad (25)$$

In the two camera settings $e_{a1}$ and $e_{a2}$, at least one of the camera parameters $s,f,D,\lambda$, must be different, i.e. $e_{a1} \neq e_{a2}$ (otherwise the two observed images $g_1(x,y)$ and $g_2(x,y)$ will be the same). Of the four camera parameters $s,f,D,\lambda$, any one of them, any two of them, any three of them, or all four of them can be different. For example, the camera settings can be such that $D_1 = D_2$, $\lambda_1 = \lambda_2$, but $f_1 \neq f_2$ and $s_1 \neq s_2$.

Let $g_{n1}(x,y)$ and $g_{n2}(x,y)$ be the brightness normalized images corresponding to the observed images $g_1(x,y)$ and $g_2(x,y)$ respectively. The values of $g_{n1}(x,y)$ and $g_{n2}(x,y)$ will be known at a discrete array of points corresponding to the positions of the photo sensitive elements on the image detector. If the image detector is moved, say from $s_1$ to $s_2$ where $s_1 > s_2$, then the lateral magnification of the image formed on the image detector decreases. Therefore, the discrete array corresponding to $g_{n1}(x,y)$ will be larger than the discrete array corresponding to $g_{n2}(x,y)$. In other words, the discrete values of $(x,y)$ at which $g_{n1}(x,y)$ is known will be denser (or more closely spaced) than the discrete values of $x,y$ at which $g_{n2}(x,y)$ is known. In this case, $g_{n1}(x,y)$ is interpolated to find its value at the same discrete points where $g_{n2}(x,y)$ is known. This operation take care of changes in magnification of the images and therefore is called magnification normalization.

If $G_{n1}(\omega,\nu)$, $G_{n2}(\omega,\nu)$ are the Fourier transforms corresponding to the images $g_{n1}(x,y)$, $g_{n2}(x,y)$ respectively (after magnification normalization), then we can derive the following relation from equation (23):

$$\frac{G_{n1}(\omega,\nu)}{G_{n2}(\omega,\nu)} = \frac{H(\omega,\nu; e_{a1}, r_0)}{H(\omega,\nu; e_{a2}, r_0)}. \quad (26)$$

In equation (26), the left hand side is the ratio of the Fourier transforms of two preprocessed images recorded with different camera settings. The right hand side is the ratio of the corresponding Optical Transfer Functions. This equation is independent of the normalized focuses image (indeed, the term corresponding to the normalized focused image cancels out while deriving this equation).

The left hand side can be computed from the recorded images. Given all the required camera parameters, an analytic expression can be derived for the right hand side. This results in an equation where the distance $r_0$ is the only unknown. Solving this equation gives the distance $r_0$ of the surface patch.

An alternative approach to determining distance by deriving an analytic expression for the right hand side of equation (26) is to calibrate the camera experimentally. In this method, the ratio on the left hand side is computed for all possible distances of a surface patch and this distance (which is determined by actually measuring it physically, say using a ruler) is tabulated as a function of the computed ratio. The table thus obtained can be stored in the computer memory. This table constitutes the calibration data for the camera system. Having calibrated the camera system, the distance of any surface patch can be determined by referring to this table.

More detailed discussion on methods for solving equation (26) is given in the following sections.

In order to reduce the effects of noise in equation (26), we choose a Fourier frequency $(\omega,\nu)$ for which $G_{n1}(\omega,\nu)$ and $G_{n2}(\omega,\nu)$ are significant, that is their magnitude is greater than a prespecified threshold $k(\omega,\nu)$. This condition is expressed as $$|G_{n1}(\omega,\nu)| \geq k(\omega,\nu), |G_{n2}(\omega,\nu)| \geq k(\omega,\nu) \text{ for } k(\omega,\nu) > 0. \quad (27)$$

This ensures that the value of the left hand side computed from the observed images is robust in the presence of noise. The actual value of $k(\omega,\nu)$ is determined by the signal to noise ratio characteristics of the camera system. It can be taken to be about five times the root means square (RMS) value of noise amplitude. That is, the signal to noise ratio is required to be about 25.

Solving For Distance: Theory

There are two methods of solving equation (26) to obtain the distance $r_0$. The first is the analytical approach. In this approach, an analytic expression is derived from the right hand side of equation (26) in terms of the camera parameters specified by $e_{a1}, e_{a2}$ and the distance $r_0$. The resulting equation is solved to obtain an explicit analytical expression for the distance $r_0$ in terms of $e_{a1}, e_{a2}$ and the ratio on the left hand side of equation (26) which is computed from the observed images.

One such method based on a Gaussian model of the point spread function is described by this inventor in copending U.S. patent application Ser. No. 126,407 field in November 1987. For the Gaussian model, it has been shown that, there will be at most two solutions for the distance. Explicit analytic expressions have been derived for the two solutions. Further, it has been shown that two fold ambiguity can be avoided and a unique solution can be obtained if the aperture diameter D is not changed or the two camera settings, i.e. when $D_1 = D_2$. Even when the diameter is changed, the twofold ambiguity results only when the camera parameters and the object distance satisfy a particular condition.

These results for the particular case of a Gaussian PSF suggest that (i) up to two solutions are possible, but it is usually unique, and (ii) the two fold ambiguity can always be avoided by a suitable choice of camera parameters. This case hints that even for a general PSF, the ambiguity is perhaps only two fold and that this ambiguity can be avoided by a suitable choice of the camera settings.

Gaussian model for the PSF is however an approximation to the actual form of the PSF. The present invention deals with an arbitrary PSF of a camera system with no restriction on its form.

An exact expression for the PSF can be derived using the electro-magnetic theory of light. For example, equations (6.24) and (6.27) (pages 114 and 115) in the book *Introduction to Fourier Optics* by J. W. Goodman, McGraw-Hill Publishers, 1968, can be used to derive an expression for the OTF (and consequently PSF) of the camera system. The exact analytic function that describes the OTF is generally very complicated. Therefore, in practice, solving equation (26) becomes very difficult, or even impossible. A further disadvantage of this method is that it requires the accurate knowledge of the values of the camera parameters specified by $e_{a1}$ and $e_{a2}$. This introduces additional complexity into the camera apparatus a the design will be required to facilitate accurate measurement of the camera parameters.

If solving equation (26) expressed in analytical form is not possible, then, a numerical iterative method can be used. However one needs efficient iterative algorithms with good convergence properties. If such algorithms are not available, then an exhaustive search of the $r_0$ space, though computationally expensive, is guaranteed to give all possible solutions for the distance of the object.

Figure 8:
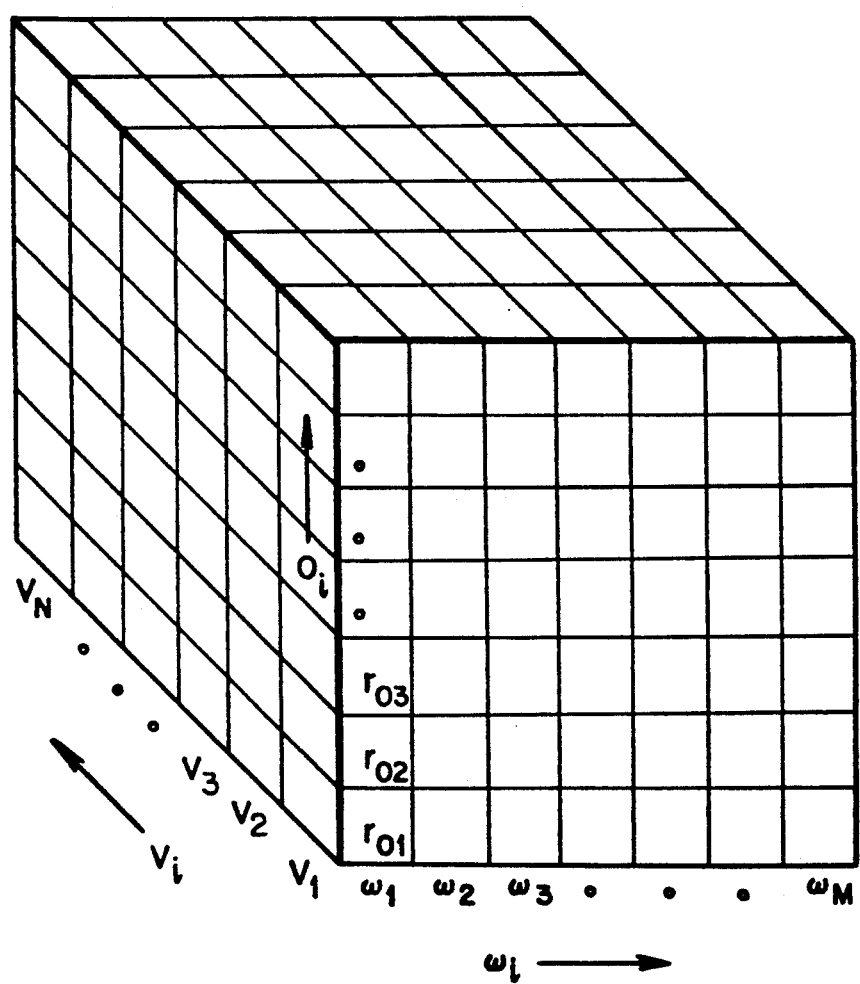
FIG. 8 is a schematic view of a 4-dimensional table $T(\omega,\nu,r_0)$ prestored in computer memory and used in the table-lookup method of determining distance.

The second method of solving equation (26) is a table look-up method. This method is very convenient from a practical point of view. In this method, first the function on the right hand side of equation (26) is tabulated as $$T_s(\omega,\nu; r_0) = \frac{H(\omega,\nu; e_{a1},r_0)}{H(\omega,\nu; e_{a2},r_0)}, \quad (28)$$

at small discrete intervals of $r_0$. See FIG. 8. The table entries are in general complex valued and therefore can be expressed in polar form as $$T_s(\omega,\nu;r_0) = \tau_s(\omega,\nu;r_0)e^{i\psi_s(\omega,\nu;r_0)} \quad (29)$$

where $$\tau_s(\omega,\nu;r_0)'|T_s(\omega,\nu;r_0)| \text{ and} \quad (30a)$$

$$\psi_s(\omega,\nu;r_0) = \text{phase}(T_s(\omega,\nu;r_0)). \quad (30b)$$

It is often sufficient to either tabulate only the $\tau_s(\omega,\nu;r_0)$ as for example in the case when the PSF is a Gaussian or a Cylindrical function, or tabulate only the $\tau_s(\omega,\nu;r_0)$ as for example is the case when the PSF is a Cylindrical function. In particular, for all circularly symmetric PSFs, the OTFs are always real valued everywhere (this follows from the properties of the Fourier transform). In this case, the phase $\tau_s$ is always either 0 or $\pi$ but $\tau_s$ can be any positive real value. Therefore $\tau_s$ contains almost all the required information in this case. Whenever $\tau_s$ alone contains sufficient information to determine the distance $r_0$, it can be computed as the square root of the power spectrum. This is an important point to note because power spectrum of an image can be computed very fast by optical means.

The correct solution for distance $r_0$ will, however, be consistent with both the tables $\tau_s(\omega,\nu,r_0)$ and $\psi_s(\omega,\nu,r_0)$, but only one of them may often suffice. For the sake of generality both the tables are considered. They together constitute the table $T_s(\omega,\nu,0)$.

Solving for Distance: Practical Considerations

In principle it is often sufficient to tabulate the function $T_s(\omega,\nu,r_0)$ for some fixed Fourier frequency $(\omega,\nu)$. However, in practice, this is inadequate because, in the observed images the corresponding Fourier components $G_{n1}(\omega,\nu)$ and $G_{n2}(\omega,\nu)$ may not be significant, or they might even be absent. Further, solving for the distance $r_0$ by measuring $G_{n1}(\omega,\nu)$ and $G_{n2}(\omega,\nu)$ at only one Fourier frequency could result in multiple solutions. Therefore the table $T_s(\omega,\nu;r_0)$ is stored for several Fourier frequencies $(\omega,\nu)$. In fact, since computer memory is inexpensive, the table could be stored for all possible Fourier frequencies. The values computed from the observed images are denoted with a subscript c and are given by $$T_c(\omega,\nu) = \frac{G_{n1}(\omega,\nu)}{G_{n2}(\omega,\nu)}, \quad (30.1)$$

$$T_c(\omega,\nu) = \tau_c(\omega,\nu)e^{i\omega_c(\omega,\nu)}, \quad (30.2)$$

where $$\tau_c(\omega,\nu) = |T_c(\omega,\nu)| \text{ and} \quad (30.3a)$$

$$\psi_c(\omega,\nu) = \text{phase}(T_c(\omega,\nu)). \quad (30.3b)$$

$\tau_c$ and $\psi_c$ are computed at several Fourier frequencies $(\omega,\nu)$ from the observed images $G_{n1}(\omega,\nu)$ and $G_{n2}(\omega,\nu)$. The values of $\tau_c$, $\psi_c$, $\omega$, and $\nu$ together determine one set of solutions for distance $r_0$. Let this set be denoted by $R_0(\omega,\nu\tau_c,\psi_c)$. The solution that is common to all the sets, that is the intersection of all the solution sets, gives the actual solution $r_0$ for object distance. This can be expressed as $$r_0 = \bigcap_\omega \bigcap_\nu R_0(\omega,\nu,\tau_c,\psi_c). \quad (31)$$

The table $T_s(\omega,\nu,0)$ is stored in a four dimensional array (see FIG. 8) of size $M \times N \times U \times 2$ where the first dimension corresponds to M distinct values of $\omega$, the second dimension to N distinct values of $\nu$, and the third dimension to U distinct values of $r_0$. Along the fourth dimension, $\tau_s$ is stored as the first entry and the phase $\psi_s$ is stored as the second entry.

Now, given $(\omega,\nu,\tau_c,\psi_c)$, it is desired to find all distance $r_0$ such that the fourth dimension entries $(\tau_s,\psi_s)$ indexed by $(\omega,\nu,r_0)$ are equal to the computed value of $(\tau_c,\psi_c)$. This can be done by searching the array along the third dimension for each value of $r_0$ and comparing the computed values of $\tau_c$ and $\psi_c$ to the stored values $\tau_s$ and $\psi_s$. Therefore, this method involves 2U comparison operations. Let $R_0(\omega,\nu,\tau_c,\psi_c)$ represent the set of all values of $r_0$ thus obtained. Now for each of these, $r_0$ values, a comparison is made to determine whether or not the computed values $\tau_c$ and $\psi_c$ at other values of $(\omega,\nu)$ are equal (or close) to the stored values $\tau_s,\psi_s$. A continual search is made for different values of $(\omega,\nu)$ until either only one value of $r_0$ is left, or all possible frequencies $(\omega,\nu)$ have been searched. The value(s) of $r_0$ that survive the search is(are) the solution(s) for distance.

Equation (31) is not enforced strictly in solving for $r_0$ for two reasons. First, since the table $T_s(\omega\nu;r_0)$ is stored at discrete values of $r_0$, each entry in the table actually corresponds to a small interval around the actual $r_0$ for which the table entry has been stored. The second reason is noise. Therefore, from each solution set $R_0(\omega,\nu,\tau_c\psi_c)$, at least one $r_0$ that is most consistent with other solution sets is chosen. If, then, the solutions are different for different $(\omega,\nu)$ say $r_0(\omega,\nu)$, then a weighted average of these different solutions are taken as an estimate of the actual distance. The weight for a candidate solution $r_0(\omega,\nu)$ can be determined based on the signal to noise ratio at $(\omega,\nu)$. For example the weight can be taken to be proportional to the signal to noise ratio at $(\omega,\nu)$. This method of solving equation (26) using equation (31) is called the set intersection method.

The initial 2U comparison operations during the search can be reduced if the table is extended by one entry in the fourth dimension to store $r_0$ and sort the entries according to $\tau_s$ and $\psi_s$ along the third dimensions instead of $r_0$. The sorted list can then be searched in $O(\log U)$ operations using one of the well-known searching algorithms (e.g. binary search).

As an alternative to the set intersection method above, a correlation method can be used which is essentially an exhaustive search of the table $T_s(\omega,\nu,r_0)$ with respect to $r_0$ for a most consistent solution. The search is carried out by computing a correlation measure between computed values $T_c(\omega,\nu)$ from the observed images, the prestored values of $T_s(\omega,\nu;r_0)$ in the table for each possible value of $r_0$. The value of $r_0$ that results in the highest correlation can be taken as the distance of the object. An example of a correlation measure is the correlation coefficient defined as $$c = \frac{E\{[T_c - E(T_c)][T_s - E(T_s)]^*\}}{\sqrt{E\{[T_c - E(T_c)][T_c - E(T_c)]^*\} E\{[T_s - E(T_s)][T_s - E(T_s)]^*\}}} \quad (31.2)$$

where the subscript "*" denotes complex conjugate, and E denotes expected value or the means value operation. The expected value or the mean is computed over different values of $(\omega,\nu)$. The correlation coefficient c is computed for all possible values of distance $r_0$ and, that $r_0$ for which $|c|$ is a maximum is taken as the distance of the object. We can similarly define and compute correlations separately for the magnitude $\tau_s$ and phase $\psi_s$. This method is convenient where a special purpose hardware is available for fast computation of correlation. Further, this method is robust against noise. In this method also, as in the set intersection method, a weighting scheme can be used based on the signal to noise ratio in the computation of the correlation measure. This will yield a better estimate of distance $r_0$.

A step by step description of the operations to be performed to find the distance of a surface patch using the preferred embodiment of the camera system is given herein.

In order to find the distance of a surface patch, the camera is set to a first camera setting $$e_{a1} = \{s_1, f_1, D_1, \nu_1\}$$

at which a first image of the scene is recorded. The camera is then set to a second camera setting $$e_{a2} = \{s_2, f_2, D_2, \lambda_2\}$$

where $e_{a1} \neq e_{a2}$, and a second image of the scene is recorded.

A surface patch in the scene is selected by specifying a square field of view centered at $(\theta_0,\phi_0)$ and having the corner points $(\theta_i,\phi_i)$ for i=1,2,3,4. Extract the image of the surface patch from the first recorded image for processing. This extracted image has the same brightness values as the first recorded image inside the square field of view selected and is represented by $g_1(\theta,\phi)$. The value outside the selected square field of view is zero.

Sensor response correction can be applied if necessary as in equation (10), and non-uniform transmission correction can be applied if necessary as set forth in equation (11). Magnification correction correction can also be applied. If $s_1 > s_2$ then the signal is interpolated and $g_1(\theta,\phi)$ is resampled at the same set of discrete points where $g_2(\theta,\phi)$ is known.

Additional preprocessing steps can be carried out, if necessary, to model the camera as a linear shift-variant system. The image is expressed as $g_1(x,y)$ in a normalized Cartesian coordinate system according to equation (5). Image-overlap effect at the borders of the image $g_1(x,y)$ can be reduced by multiplying it by a suitable center-weighted mask $w(x,y)$ (e.g. a two-dimensional Gaussian), i.e.

$$g_1(x,y) \leftarrow w(x,y) g_1(x,y).$$

The total (or mean) brightness of $g_1(x,y)$ and $g_2(x,y)$ is made to be the same, such as unity as in equation (3). The Fourier coefficients $G_{n1}(\omega_i,\nu_j)$ of $g_{n1}(x,y)$ are computed at a set of discrete spatial frequencies $(\omega_i,\nu_j)$ for i=1,2,...,m and j=1,2,...,n.

The image of the surface patch is extracted from the second recorded image for processing. The extracted image has the same brightness values as the second recorded image inside the selected square field of view, and everywhere outside the square field of view the brightness value is zero. This second image is represented as $g_2(\theta,\phi)$.

The second recorded image is processed as the first image for sensor response correction, correction for non-uniform transmission, magnification correction, brightness normalization, other preprocessing steps, and image overlap reduction. The resulting image is denoted by $g_{n2}(x,y)$. For this image, the Fourier coefficients $G_{n2}(\omega_i,\nu_j)$ are computed at a set of discrete spatial frequencies $(\omega_i,\nu_j)$ for i=1,2,...,m and j=1,2,...,n.

A threshold parameter function $\kappa(\omega_i,\nu_j)$ can be specified based on image noise characteristic of the camera system. Then, if $|G_{n1}(\omega_i,\nu_j)| \geq \kappa(\omega_i,\nu_j)$ and $|G_{n2}(\omega_i,\nu_j)| \geq \kappa(\omega_i,\nu_j)$ then the ratio of corresponding coefficients is computed as $$T_c(\omega_i,\nu_j) = \frac{G_{n1}(\omega_i,\nu_j)}{G_{n2}(\omega_i,\nu_j)}.$$

Also, compute the magnitude $\tau_c$ and phase $\psi_c$ as in equations (30a,b).

In order to calculate the distance analytically, an expression can be derived which has the form $$T_s(\omega_i,\nu_j,r_0) = \frac{H(\omega_i,\nu_j,e_{a1},r_0)}{H(\omega_i,\nu_j,e_{a2},r_0)}.$$

In the above equation, the Optical Transfer Function H is derived from a theory of image formation (e.g. paraxial geometric theory, or wave optics theory). The values of $\omega_i,\nu_j,e_{a1},e_{a2}$ are substituted in the above equation, and the equation can be solved to obtain all possible solutions for the distance $r_0$. If an explicit expression can be derived for $r_0$, then this expression is used to compute $r_0$. Otherwise, a numerical iterative technique is used. In either case, if there are multiple solutions, then spurious solutions are eliminated by requiring all the solutions to be consistent for all possible spatial frequencies $(\omega_i,\nu_j)$.

Alternatively, denote each computed ratio $\tau_c(\omega_i,\nu_j)$ by $\tau_{cij}$ and phase $\psi_c(\omega_i,\nu_j)$ by $\psi_{cij}$. use $(\omega_i,\nu_j,\tau_{cij},\psi_{cij})$ to index into a prestored table in computer memory to find one set of solution $R_0(\omega_i,\nu_j,\tau_{cij},\psi_{cij})$ for the distance $r_0$. Take the intersection of such sets over the spatial frequencies as in equation (31) to eliminate spurious solutions of $r_0$, i.e.

$$r_0 = \bigcap_i \bigcap_j R_0(\omega_i, \nu_j, \tau_{cij}, \psi_{cij}).$$

In a third method, compute the correlation coefficient $c_\tau(r_0)$ between the computed $\tau_c(\omega_i,\nu_j)$ and a function $\tau_s(\omega_i,\nu_j;r_0)$ prestored in computer memory for all possible distances $r_0$. Find the value of distance $r_0$ for which the correlation $c_\tau$ is a maximum. This value of $r_0$ gives an estimate of the distance of the surface patch. If there are multiple values of $r_0$ which result in the same maximum correlation coefficient, then, for these values of $r_0$, compute the correlation $c_\psi(r_0)$ between the computed phase $\psi_c(\omega_i,\nu_j)$ and a function $\psi_s(\omega_i,\nu_j;r_0)$ prestored in computer memory. Now find the value of $r_0$ for which $c_\psi$ is a maximum. This value of $r_0$ gives an estimate of the distance of the surface patch.

The uncertainty $|\delta r_0|$ in the distance $r_0$ can be computed using equation (87).

Precomputing the Table

There are two methods for obtaining the table $T_s(\omega,\nu,r_0)$. The first one is by using the analytic expression for the OTF $H(\omega,\nu;e_a,r_0)$ and computing the right hand side of equation (28). This requires an analytic expression for the OTF H in terms of $(\omega,\nu;e_a,r_0)$. Further, it requires the accurate knowledge of $e_{a1},e_{a2}$ through measurements on the camera system. This method is set forth herein.

After a theory of image formation has been selected, e.g. paraxial geometric optics, or classical wave optics, an expression for the Optical Transfer Function H of the camera system can be derived. This Optical Transfer Function can be expressed in terms of the camera parameters $e_a$, the distance $r_0$ of a surface patch, and the Fourier spatial frequencies $(\omega,\nu)$.

A suitable set of camera settings $e_{a1},e_{a2}$ are chosen and the discrete values of $(\omega,\nu,r_0)$ at which the optical transfer function needs to be computed can be determined.

For any given camera setting, $e_a$, the value of the optical transfer function $H(\omega,\nu;r_0)$ can be computed at discrete values of $(\omega,\nu;r_0)$ using the expression derived previously. The computed values can be stored in computer memory and used in determining the improved focus image of a surface patch.

In order to precompute a table for determining the distance of a surface patch given two images of it taken with different camera settings $e_{a1}$ and $e_{a2}$, first compute the optical transfer functions of the camera for camera settings $e_{a1}$ and $e_{a2}$ at desired discrete values of $(\omega,\nu;r_0)$. The ratio of these optical functions gives the required table values which can be computed in the following form:

$$T_s(\omega,\nu;r_0) = \frac{H(\omega,\nu;\ e_{a1},r_0)}{H(\omega,\nu;\ e_{a2},r_0)}$$

and stored in computer memory. The table computed is complex valued. Each entry can also be stored in the magnitude and phase form according to equations 30a,30b).

An exact analytic function of the OTF is given, for example, by equations (6.24) and (6.27) (pages 114 and 115) in the book *Introduction to Fourier Optics* by J. W. Goodman, McGraw-Hill Publishers, 1968. This function becomes very complicated for practical camera systems. However paraxial geometric optics provides a good first approximation for many practical camera systems. Therefore the analytic method of precomputing the table is useful for this case. In addition, the paraxial geometric optics model can be used to derive other useful design criteria for the camera apparatus.

Precomputing the Table: Proximal Geometric Optics

Figure 9:
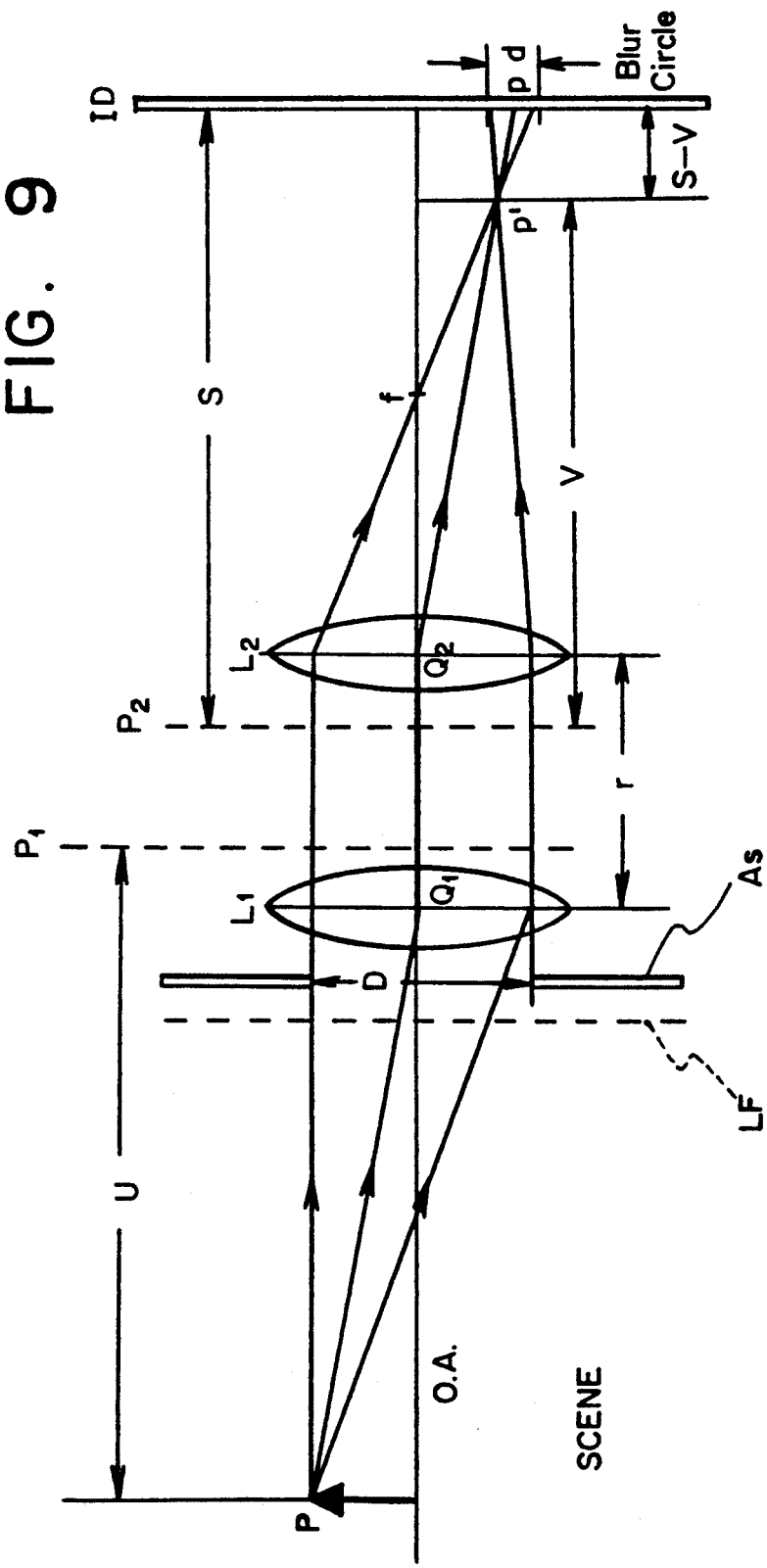
FIG. 9 illustrates the image formation process in the preferred embodiment of the camera system under paraxial geometric optics theory.

In the preferred embodiment, the optical system is circularly symmetric (this is largely true of most practical camera systems). Under the conditions of paraxial geometric optics (see FIG. 9), the point spread function is cylindrical or "pill-box" give by $$h_g(x,y) = \begin{cases} \frac{1}{\pi R^2} & \text{if } x^2 + y^2 \leq R^2 \\ 0 & \text{otherwise} \end{cases} \quad (32)$$

where R is the radius of the blur circle. We will represent the camera setting specified by the camera parameters s,f,D by a vector $e_a$ where $$e_a = (s,f,D). \quad (33)$$

(Note: in geometric optics, diffraction effects are not considered, and therefore we drop $\lambda$ from the list of camera parameters). From FIG. 9 and the lens formula $$\frac{1}{f} = \frac{1}{u} + \frac{1}{v} \quad (34)$$

we obtain (after normalization for unit magnification)

$$R(e_a;u) = \frac{D}{2}\left(\frac{1}{f} - \frac{1}{u} - \frac{1}{s}\right). \quad (35)$$

In the above equations, f is the effective focal length, s is the distance from the second principal plane to the image detector, D is the aperture diameter, v is the distance of the focused image from the second principal plane, and u is the distance of the object from the first principal plane (note: $u = r_0 \cos\theta_0$ in the spherical coordinate system in FIG. 5). The actual radius of the blur circle on the image detector has been divided by s to obtain the normalized radius R corresponding to unit image magnification. The effective focal length f is determined from equation (1).

Since the point spread function in equation (32) is circularly symmetric, the optical transfer function is also circularly symmetric. Therefore a single spatial frequency parameter p in the optical transfer function can be used where $$\rho(\omega,\nu) = \sqrt{\omega^2 + \nu^2}. \quad (36)$$

The Fourier transform of equation (32) is the optical transfer function given by $$H(\omega,\nu;e_a,u) = 2\frac{J_1(R(e_a;u)\rho(\omega,\nu))}{R(e_a;u)\rho(\omega,\nu)} \quad (37)$$

where $J_1$ is the first order Bessel function. This equation explicitly represents the dependence of the optical transfer function on the camera parameters and the object distance.

From equations (28,36,37) we have $$T_s(p,u) = \frac{R(e_{a2};u) \, J_1(\rho(\omega,\nu)R(e_{a1};u))}{R(e_{a1};u) \, J_1(\rho(\omega,\nu)R(e_{a2};u))} \tag{38}$$

where $$e_{a1}=(s_1,D_1,f_1) \text{ and } e_{a2}=(s_2,D_2,f_2). \tag{39}$$

Given the camera parameters $e_{a1}$, $e_{a2}$, the OTF table corresponding to equation (37) and the table $T_s(p,u)$ in equation (38) can be easily computed by a computer using equations (35) and (36).

Precomputing the Table: Experimental Approach

The second method of obtaining the table $T_s(\omega,\nu,r_0)$ is through experiments. The experimental method is convenient if an analytic expression for $H(\omega,\nu;e_a,r_0)$ is not available, or it is difficult to compute, or it is difficult to measure $e_{a1},e_{a2}$ of the camera system accurately. In this case, the observed image of the camera system $g_1(x,y)$ for camera setting $e_{a1}$ and $g_2(x,y)$ for camera setting $e_{a2}$ are recorded for each possible value of $r_0$ at small discrete intervals. Then the table entries are computed as $$T_s(\omega,\nu;r_0) = \frac{G_{n1}(\omega,\nu;r_0)}{G_{n2}(\omega,\nu;r_0)} \, . \tag{40}$$

Note that, it is not necessary to know the focused image $f(x,y)$ to experimentally determine the table. We only require that $|F(\omega,\nu)| \geq \kappa(\omega,\nu)$ so that condition (27) is satisfied, thus yielding robust estimates for the table entries. This requirement can be easily met for any $(\omega,\nu)$, for example, by taking the focused image to be a high contrast sine wave pattern with spatial frequency $(\omega,\nu)$.

In determining the table entries, one needs to be able to measure accurately the distance $r_0$ of the object from the camera system during the initial calibration step. Although it is not necessary to know any components of $e_{a1}$ and $e_{a2}$, knowledge of the ratio $s_1/s_2$ is necessary to normalize the magnification of the observed images.

Figure 10:
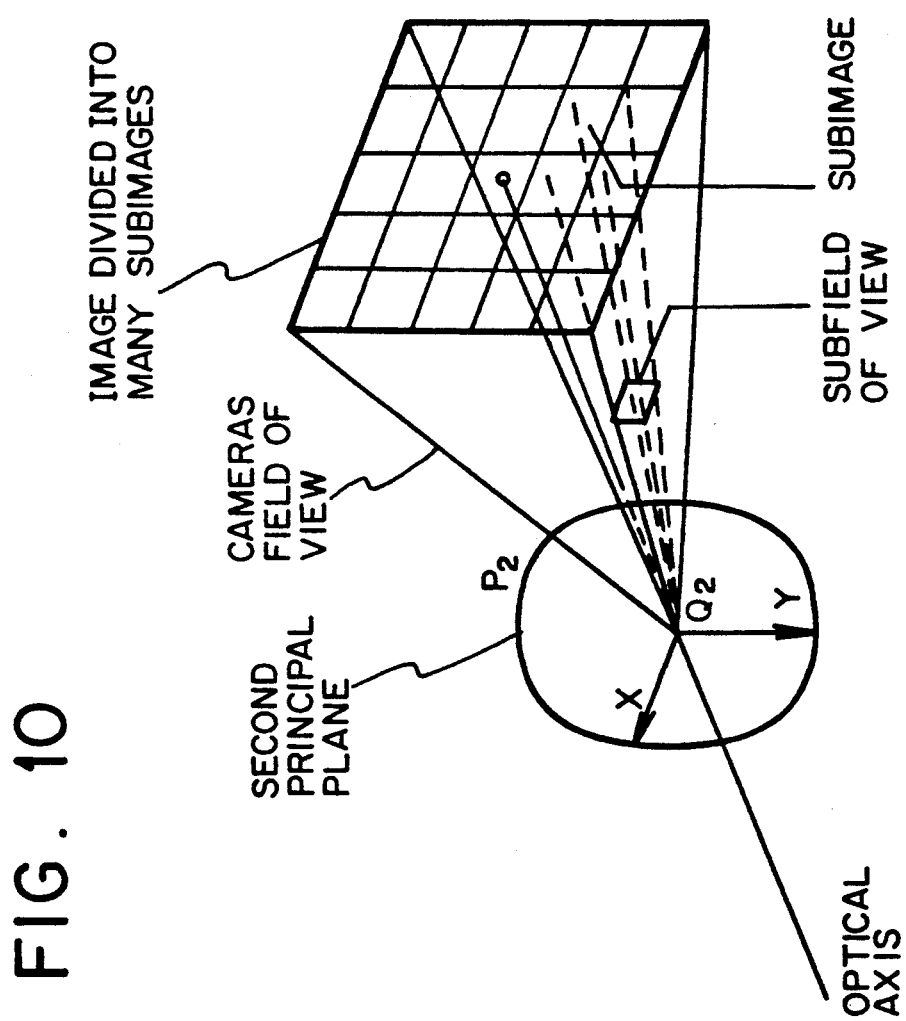
FIG. 10 shows an image divided into many smaller subimages, each subimage corresponding to one surface patch which spans a small field of view in the scene.
Figure 11:
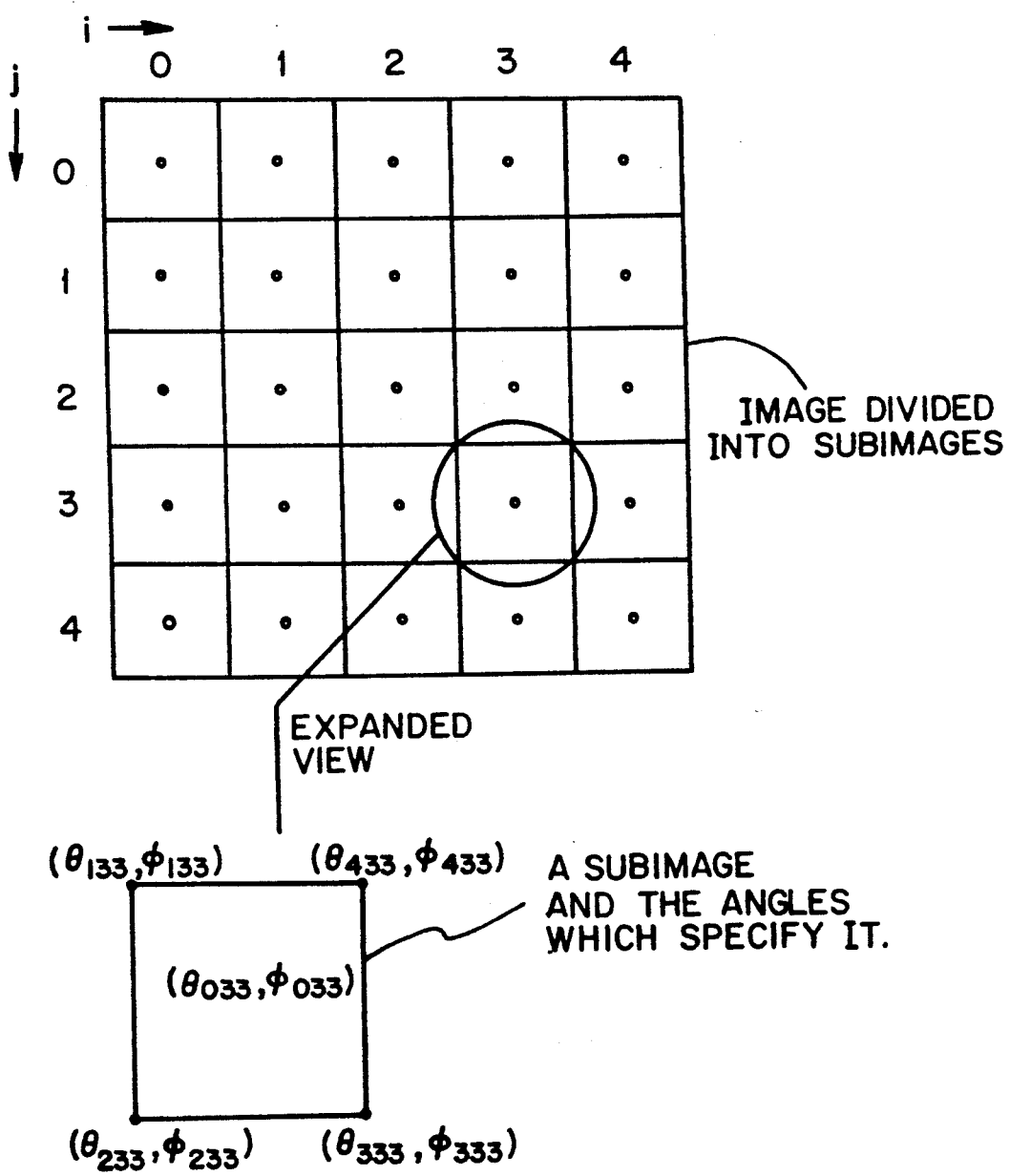
FIG. 11 shows the subimages of an image and the angels which specify them.

To precompute the look-up table by the experimental approach, do the following steps. Divide the field-of-view of the camera into many smaller subfields. See FIG. 10 and FIG. 11. The size of these subfields are chosen such that within each subfield optical aberrations remain nearly constant. For the convenience of implementation, make the subfield-of-views have a square cross section parallel to the image detector. Each subfield-of-view is then centered at $(\theta_{0ij},\phi_{0ij})$ for $i=1,2,\ldots,I$ and $j=1,2,\ldots,J$, and the corresponding corner points are respectively $(\theta_{kij},\phi_{kij})$ for $k=1,2,3,4$.

For each subfield-of-view, compute and store the table $T_s(\omega,\nu;r_0)$ by selecting a subfield-of-view centered at $(\theta_0,\phi_0)$ and having corners at $(\theta_i,\phi_i)$ for $i=1,2,3,4$. Place a flat board which is uniformly dark everywhere and place it at the center and normal to the direction $(\theta_0,\phi_0)$. The distance of the board should be $r_0$ from the camera system. Place a flat high contrast picture having high content of spatial frequencies (e.g., a pattern of large bright areas randomly distributed on a dark background) and fix it at the center of the board. The size and location of the picture should be such that it spans the selected subfield-of-view.

Set the camera to a first camera setting $e_{a1}$ and record a first image of the scene as previously explained. Similarly, set the camera to a second camera setting $e_{a2}$ and record a second image.

Extract a subimage $g_1(\theta,\phi)$ from the first recorded image which contains the image of the picture pattern and surrounded by a wide dark band corresponding to the image of the board. Images of not other objects should be present in this subimage. This ensures that almost all of the light distribution produced by the attached picture is recorded in the extracted subimage. Furthermore, border effects are avoided as the intensity remains constant at the border. Repeat this step for the second recorded image and extract the subimage $g_2(\theta,\phi)$.

Preprocess the subimages $g_1(b,\phi)$ and $g_2(\theta,\phi)$ and compute their normalized Fourier transforms $G_{n1}(\omega_i,\nu_j)$ and $G_{n2}(\omega_i,\nu_j)$ respectively as described previously. The table to be stored, $T_2(\omega_i,\nu_j,r_0)$ is given by $$T_s(\omega_i,\nu_j,r_0) = \frac{G_{n1}(\omega_i,\nu_j)}{G_{n2}(\omega_i,\nu_j)} \, .$$

Alternatively, the magnitude table and phase table an be stored as $$\tau_2(\omega_i,\nu_j,r_0) = |T_s(\omega_i,\nu_j,r_0)| \text{ and}$$

$$\psi_s(\omega_i,\nu_j,r_0) = \text{phase}(T_s(\omega_i,\nu_j,r_0)).$$

Find the focused image $f(x,y)$ of the picture fixed on the board by some means (e.g. by actually focusing the camera on the picture and recording it, or separately digitizing the picture pattern). Normalize the focused image $f(x,y)$ for brightness, magnification, etc. to obtain $f_n(x,y)$. Compute the Fourier transform $F_n(\omega_i,\nu_j)$ of $f_n(x,y)$. If $|G_{n1}(f_i,\nu_j)| \geq \kappa(\omega_i,\nu_j)$ then compute the table giving the Optical Transfer Function as $$H_s(\omega_i,\nu_j,r_0) = \frac{G_{n1}(\omega_i,\nu_j)}{F_n(\omega_i,\nu_j)} \, .$$

The steps are repeated steps for all required distances $r_0$.

If the table is obtained experimentally using equation (40), then the actual camera parameters $e_{a1}$ and $e_{a2}$ can be obtained using equation (28). This of course requires knowledge of an analytic expression for the right hand side of equation (28). For each table entry corresponding to a particular value of $(\omega,\nu,r_0)$, one constraint is obtained on the camera parameters $e_{a1},e_{a2}$ given by equation (28). Writing this constraint for all table entries, a large overdetermined system of equations is obtained. Now the problem is to solve these equations to obtain the camera parameters $e_{a1}$, $e_{a2}$. This is the classical parameter estimation problem which can be solved by one of the well-known techniques in applied mathematics, for example the least-squares error minimization technique. In principle, this technique gives a method for determining n unknown parameters of a camera system using at least $n+1$ images of a surface patch, each image acquired with different camera settings.

Resolution and limits of distance

In order to determine the table entries, one has to first decide on the limits and the intervals on the distance u and the Fourier frequencies $(\omega,\nu)$ at which the values have to be determined and stored. A method for determining these limits and intervals based on the principles of paraxial geometric optics is described below.

Limits of u: The minimum distance $u_{min}$ of an object for which a real image can be produced by the optical system is f. There is no such restriction on the maximum distance $u_{max}$ and it can be infinity. Let $$u_{min}=k_{min}f \text{ and } u_{max}=k_{max}f \text{ for} \\ 1 \leq k_{min} \leq k_{max} < \infty. \tag{41}$$

The actual values of $k_{min}$ and $k_{max}$ are determined by the application domain. For example, in machine vision applications, their typical values are $k_{min}=2$ and $k_{max}=\infty$.

Resolution of u: Let the approximate distance between two sensor elements on the image detector be p. We will refer to this distance as the pixel size. Two points can be distinguished as being at different distances from the camera when the blur circles produced by them differ in their diameter by a value which is comparable to the size p of a pixel. This distance is taken to be the size p of one pixel (it can also be taken as some fixed fraction of the size of a pixel depending on the photo-sensitivity of the sensors, i.e. grey-level resolution of a digital image). For a given image detector position s, the normalized size of a pixel corresponding to unit magnification is p/s, or, approximately, p/f. Therefore, the minimum difference in radius $\delta R$ of two points should be $$|\delta R| = p/2f \tag{42}$$

From equation (35) we have $$|\delta R| = \frac{D}{2} \left| \delta\left(\frac{1}{u}\right) \right|. \tag{43}$$

From the above two equations (42,43) we get $$\left| \delta\left(\frac{1}{u}\right) \right| = \frac{p}{Df}. \tag{44}$$

The above equation suggest that the table $T_s(\omega,\nu,u)$ should be computed at equal intervals of $1/u$ and not at equal intervals of u.

Above we have expressed the size of the interval of $1/u$ in terms of the camera parameters. The size U of the table along the u dimension is $$U = \frac{(1/u_{min}) - (1/u_{max})}{\delta(1/u)} = \frac{(1/f) - (1/\infty)}{(p/Df)} = \frac{D}{p}. \tag{45}$$

Therefore the table size is D/p. The pixel size p itself is determined by the sensor technology and the diffraction limited resolution of the optical system. According to the widely used Rayleigh Criterion, the angular separation of two points that are barely resolved by our lens system is $$1.22\lambda/D \text{ radians}. \tag{46}$$

Not much is gained by making the angular size p/f of the pixel smaller than this. Therefore, $$p \approx 1.22\lambda f/D. \tag{47}$$

Resolution and Limits of Spatial Frequencies

Since p is the distance between two sensor elements, it represents the spatial sampling period of the image signal. In the magnification normalized image, the sampling period is p/s where s is the distance of the image detector from the second principal plane. If the sampled image is a discrete array of size $M \times N$ elements, then the Discrete Fourier Transform (DFT) of the magnification normalized image contains $M \times N$ distinct spatial frequencies $(\omega,\nu)$ given by $$\omega_i = \frac{2\pi si}{Mp} \text{ radians/unit distance for } i = 0,1,2,\ldots,M-1 \tag{48}$$

and $$\nu_i = \frac{2\pi si}{Np} \text{ radians/unit distance for } i = 0,1,2,\ldots,N-1. \tag{50}$$

Therefore, the maximum table size is $$U \times M \times N. \tag{51}$$

In general, depending on the specific application, the table size could be smaller. For example, if the PSF is circularly symmetric, then the OTF is also circularly symmetric, and therefore the OTF can be stored as a function of a single frequency p where $$\rho_{ij} = \sqrt{\omega_i^2 + \nu_j^2} \text{ for } i = 1,2,\ldots,M/2, j = 1,2,\ldots,N/2. \tag{52}$$

If the image is a square $N \times N$ matrix, then the table can be stored for $p=1,2,\ldots,N/2$. Therefore the table size for this case is only $U \times N/2$. Thus the table size can be very much smaller than when the PSF is not circularly symmetric.

Rapid Autofocusing

A method for finding the distance of a surface patch of an object from a camera system has been described above in detail. A similar method is used for the rapid autofocusing of a camera system. In this method, first the distance of the surface patch to be focused is determined using the above method. On the basis of this distance, the values of at least one of the two camera parameters (i) focal length of the image forming system, and (ii) the distance of the image detector from the second principal plane, which brings the surface patch into focus is(are) determined. This determination is done by using an image focusing formula. Setting the camera parameters to the values thus determined accomplishes autofocusing. For example, equation (34) which is derived from paraxial geometric optics theory can be used to find the values of the focal length f and image detector position $s=v$ for which the object will be focused.

Basically, after the distance $r_0$ of the surface patch from the camera has been found, the focusing formula such as the lens equation (34) can be used to determine camera parameter values $\{s,f\}$ which bring the surface patch into focus. Alternatively, the distance (and possible the field of view in which the surface patch lies) is used to index into a prestored table in computer memory which provides desired camera parameter values {s,f} for brining the surface patch into focus. The camera parameters are subsequently achieved by moving the camera elements to obtained focus parameters {s,f}.

Obtaining Improved Focus Images

Now a method of obtaining improved focus images of a scene from its blurred images will be described. From equation (19) the following relation can be derived:

$$F(\omega,\nu) = \frac{G(\omega,\nu)}{H(\omega,\nu;e_a,r_0)} . \qquad (53)$$

This equation corresponds to inverse filtering the Fourier transform $G(\omega,\nu)$ of the observed image with the OTF $H(\omega,\nu;e_a r_0)$ of the camera system. As a result of this operation, the Fourier transform of the focused image $F(\omega,\nu)$ is obtained. Inverse Fourier transform of $F(\omega,\nu)$ gives the required focused image $f(x,y)$.

In order to obtain the focused image of a surface patch, first its distance from the camera system is determined using the method described earlier. Then the corresponding OTF is determined from the distance and the camera parameter values. Equation (53) is then used to obtain the focused image of the surface patch. Repeating these steps for each surface patch in the scene, the focused image of all surface patches can be obtained. Putting together all the focused images thus obtained, we get the focused image of the entire scene.

Record two images of the scene for two different camera settings as in the method of determining the distance of a surface patch. Divide the field of view of the camera into many smaller subfields as in FIG. 10 and FIG. 11. The size of these subfields are chosen such that within each subfield optical aberrations remain nearly constant. For the convenience of implementation, make the subfield-of-views have a square cross section parallel to the image detector. Let the subfield-of-vies be centered at $(\theta_{0ij},\phi_{0ij})$ for $i=1,2,\ldots,I$ and $j=1,2,\ldots,J$, and let the corresponding corner points be given by $(\theta_{kij},\phi_{kij})$ for $k=1,2,3,4$.

In each subfield of view, find the improved focus image of the corresponding surface patch in the scene as set forth above. Combine the improved focus images of all surface patches by putting them together in appropriate positions to synthesize the improved focus image of the entire scene.

In order to obtain the improved focus image according to equation (53), we need to know the OTF $H(\omega,\nu;e_a,r_0)$ of the camera system. Determination of the OTF is similar to the determination of the table $T_s(f,\nu,r_0)$ in the method of determining distance described earlier. There are two methods of determining the OTF, one is form a theoretical model of the camera system, and the other is through experiments. In the first method, the theoretical model of the camera system is used to drive an analytic expression for the OTF in terms of the camera parameters and the distance of the object. For example, equation (37) is derived from the paraxial geometric optics theory. Another example of the OTF derived from the diffraction theory of light is described in a paper entitled The frequency response of a defocused optical system by H. H. Hopkins in *Proceedings of the Royal Society of London*, A, 231, pages 91-103, 1955. An efficient computational method for determining this OTF based on diffraction theory is presented in a paper titled *Tables of the Modulation Transfer Function of a Defocused Perfect Lens*, Vol. 7, No. 5, APPLIED OPTICS, pages 967-974, May 1968.

In order to precompute the OTF, an image formation theory, e.g., paraxial geometric optics or classical wave optics, is chosen. An expression is then derived for the OTF, H, of the camera system in terms of the camera parameters $e_a$, the distance $r_0$ of a surface patch, and the Fourier spatial frequencies $(\omega,\nu)$. A suitable set of camera settings $e_{a1},e_{a2}$ must be chosen. Then the discrete values of $(\omega,\nu;r_0)$ at which the OTF needs to be computed are determined. The value of the OTF H $(\omega,\nu;r_0)$ at discrete values of $(\omega,\nu;r_0)$ are determined for a given setting, e.g., $e_1$. These values are stored in computer memory for use in determining the improved focus image of a surface patch.

The theoretical method of determining OTF requires the accurate knowledge of the camera parameters $e_a$. In a physical camera system, it might be difficult to measure the parameters accurately. An alternative to the theoretical approach is the experimental calibration of the camera system. In this method, an object having a known focused image $f(x,y)$ is imaged for all possible distances $r_0$ of the object from the camera system. In imaging the object for different positions, the camera parameter setting $e_a$ remains unchanged. However the actual values of the camera parameters need not be known. For each position $r_0$ of the object, the observed image $g(x,y;r_0)$ is recorded. The OTF is then computed from $$H(\omega,\nu;r_0) = \frac{G(\omega,\nu;r_0)}{F(\omega,\nu)} . \qquad (53.1)$$

The OTF is prestored in computer memory in a three-dimensional array indexed by $(\omega,\nu,r_0)$. This table is similar to the table $T_s(\omega,\nu,r_0)$ used in the method of finding distance of objects.

After recording images in the field of view and subdividing it so that each subfield has a square cross section parallel to the image detector (letting the subfield of view be centered at $(\theta_{0ij},\phi_{0ij})$ for $i=1,2,\ldots,I$ and $j=1,2,\ldots,J$ and letting the corresponding corner points to be given by $(\theta_{kij},\phi_{kij})$ for $k=1,2,3,4$), compute and store the table $T_s(\omega,\nu; r_0)$ and the OTF $H_s(\omega,\nu;r_0)$ as set forth below.

Select a subfield-of-views centered at $(\theta_0,\phi_0)$ and having corners at $(\theta_i,\phi_i)$ for $i=1,2,3,4$. Place a large flat board which is uniformly dark everywhere at the center and normal to the direction $(\theta_0,\phi_0)$. The distance of the board should be $r_0$ from the camera system (more precisely, from the first principal point of the optical system of the camera). Then fix a flat high contrast picture having high content of spatial frequencies (e.g., a pattern of large blobs randomly distributed on a dark background) at the center of the flat board. The size and location of the picture should be such that it exactly spans the selected subfield-of-view. (The flat board should be much larger, say about 9 times in area, than the picture.)

Record the first and second images of the surface patch (the picture fixed on the board). A subimage $g_1(\theta,\phi)$ is extracted from the first recorded image which contains the image of the picture pattern and surround by a wide dark band corresponding to the image of the flat board behind. Images of no other objects should be present in this subimage. This ensures that almost all of the light distribution produced by the pasted picture is recorded in the extracted subimage. Further, it avoids border effects as the intensity remains constant at the border. Repeat the above for the second recorded image and extract the subimage $g_2(\theta,\phi)$.

Then the images $g_1(\theta,\phi)$ and $g_2(\theta,\phi)$ are normalized and the noise minimized as described hereinabove for application to values entered in the prestored table. The table to be stored, $T_s(\omega_i,\nu_j;r_0)$ is given by $$T_s(\omega_i,\nu_j;r_0) = T_c(\omega_i,\nu_j).$$

Alternatively, the magnitude table and phase table given by $$\tau_s(\omega_i,\nu_j;r_0) = \tau_c(\omega_i,\nu_j),$$

$$\psi_s(\omega_i,\nu_j;r_0) = \psi_c(\omega_i,\nu_j)$$

can be stored.

The focused image $f(x,y)$ of the picture pasted on the flat board is found by some means (e.g. by actually focusing the camera on the picture and recording it, or separately digitizing the picture pattern). The focused image $f(x,y)$ is normalized for brightness, magnification, etc. to obtain $f_n(x,y)$. The Fourier transform $F_n(\omega_i,\nu_j)$ of $f_n(x,y)$ is computed. If $|G_{n1}(\omega_i,\nu_j)| \geq \kappa(\omega_i,\nu_j)$ then compute the table giving the Optical Transfer Function is computed as $$H_s(\omega_i,\nu_j;r_0) = \frac{G_{n1}(\omega_i,\nu_j)}{F_n(\omega_i,\nu_j)}.$$

The above steps are repeated for all required distances $r_0$.

In the method of finding the distance of objects described earlier, a method was given for estimating the camera parameters from the table $T(\omega,\nu,r_0)$ where the table entries were obtained experimentally. A similar method can be used to estimate the camera parameters $e_a$ given the table of $H(\omega,\nu,r_0)$ obtained rom experiments. In this case, it is necessary to know the analytic expression for the OTF $H(\omega,\nu;e_a,r_0)$. Each table entry gives one constraint on the camera parameters $e_a$. Solving the system of equations resulting from each table entry gives an estimate of the camera parameters $e_a$.

Another method of obtaining improved focus image from a single blurred image involves human intervention. If a blurred image taken weight the camera parameters set to $e_a$ is given, and the OTF $H(\omega,\nu; e_a,r_0)$ is known either in the form of an analytic expression or in the form of a prestored table, then the blurred image is inverse filtered with respect to this OTF for each possible value of distance $r_0$. As a result, a sequence of images are obtained which are candidates for the focused image. These images are then presented to a human subject who can select the "focused image" from the image sequence. This method is useful for blurred images containing objects familiar to humans, for example faces of people, car, houses, etc. Note that the human subject need to be familiar with only the generic object in the image, not necessarily the specific instance of the object. For example, it is only necessary to know that a given blurred image is the face of a person, and it is not required to have actually seen that person before.

Generalization of the Method

A method has been described above for determining the distance $r_0$. In this method, note that $r_0$ is just one of the parameters (along with the other camera parameters $s,f,D,\lambda$) on which the point spread function depends. From a mathematical point of view, all these parameters including $r_0$ play the same role in equation (26). There is no uniqueness associated with any of them. Therefore, a method which is identical to the above method can be used to find any other parameters $s,f,D,\lambda$ on which the point spread function depends. For example, to determine the focal length $f$ of the camera system, the distance $r_0$ is taken to be given and equation (26) is solved for $f$ as before.

The above method for determining one unknown parameter can be extended to obtain a method to determine more than one unknown. In this case more than two images are needed. In general, if n unknowns are involved then $n+1$ images are required. For example, in order to determine two parameters, say $r_0$ and $f$, three pictures $g_1(x,y)$, $g_2(x,y)$ and $g_3(x,y)$ are taken with camera sittings $e_{a1}$, $e_{a2}$, and $e_{a3}$ respectively where $$e_{a1} = (s_1, D_1, \lambda_1) \quad (54)$$

$$e_{a2} = (s_2, D_2, \lambda_2) \quad (55)$$

$$e_{a3} = (s_3, D_3, \lambda_3). \quad (56)$$

For the Fourier transforms and the OTFs of the three pictures, the following relations can be derived:

$$\frac{G_{n1}(\omega,\nu)}{G_{n2}(\omega,\nu)} = \frac{H(\omega,\nu;e_{a1},f,r_0)}{H(\omega,\nu;e_{a2},f,r_0)}. \quad (57)$$

$$\frac{G_{n2}(\omega,\nu)}{G_{n3}(\omega,\nu)} = \frac{H(\omega,\nu;e_{a2},f,r_0)}{H(\omega,\nu;e_{a3},f,r_0)}. \quad (58)$$

Equations (57), (58) are solved simultaneously to obtain the two unknowns $f,r_0$. Methods similar to the earlier case can be used to solve the equation. In this case the table becomes bigger due to two unknowns rather than just one in the previous case. The two equations above imply that the unknowns $r_0$ and $f$ should remain the same for all the three pictures. However this need not be the case as long as the change in their values are known. For example, let the focal lengths be $f+\delta_1$, $f+\delta_2$, and $f+\delta_3$ for the three images where the change in values $\delta_1$, $\delta_2$, and $\delta_3$ are all known. Then, for the Fourier transforms and the OTFs of the three pictures one can derive $$\frac{G_{n1}(\omega,\nu)}{G_{n2}(\omega,\nu)} = \frac{H(\omega,\nu;e_{a1},f+\delta_1,r_0)}{H(\omega,\nu;e_{a2},f+\delta_2,r_0)}, \quad (59)$$

$$\frac{G_{n2}(\omega,\nu)}{G_{n3}(\omega,\nu)} = \frac{H(\omega,\nu;e_{a2},f+\delta_2,r_0)}{H(\omega,\nu;e_{a3},f+\delta_3,r_0)}. \quad (60)$$

The two equations above involve only to unknowns (f and $r_0$) and hence can be solved as before.

Method of Estimating Uncertainty in Distance

A method is described here to estimate the uncertainty in the determination of distance $r_0$ in terms of the uncertainty in the measurement of the image signal and the camera parameters.

From equations (26), (28), and (30a) derive $$\tau(\omega,v,r_0) = \frac{|G_{n1}(\omega,v)|}{|G_{n2}(\omega,v)|} . \quad (71)$$

Taking differentials gives $$\frac{\delta\tau}{\tau} = \frac{\delta|G_{n1}(\omega,v)|}{|G_{n1}(\omega,v)|} - \frac{\delta|G_{n2}(\omega,v)|}{|G_{n2}(\omega,v)|} . \quad (72)$$

For additive random noise $$G_{n1}(\omega,v) = G_{s1}(\omega,v) + n_1(\omega,v) \quad (73)$$

where $G_{s1}(\omega,v)$ corresponds to the noise-free image signal, and $n_1(\omega,v)$ corresponds to nose. Let $Q_{s1}(\omega,v)$ denote the power spectrum of the signal and $Q_{n1}(\omega,v)$ denote the power spectrum of noise, i.e., $$Q_{s1}(\omega,v) = G_{s1}(\omega,v)G^*_{s1}(\omega,v) = |\omega,v)|^2, \text{ and} \quad (74)$$

$$Q_{n1}(\omega,v) = n_1(\omega,v)n^*_1(\omega,v) = |n_1(\omega,v)|^2. \quad (75)$$

Using the algebra for complex numbers, it can be shown that $$\frac{\delta|G_{n1}|}{|G_{n1}|} = 1 + \frac{Q_{n1}}{Q_{s1}} + 2\left(\frac{\sqrt{Q_{n1}}}{\sqrt{Q_{s1}}}\right)\cos(\psi_{s1} - \psi_{n1}) - 1, \quad (76)$$

where $\psi_{s1}$ is the phase of the signal and $\psi_{n1}$ is the phase of the noise. Since the cosine function takes values in the range $|-1,+1|$, the above equation can be simplified to get $$\frac{\delta|G_{n1}|}{|G_{n1}|} \leq \sqrt{\frac{Q_{n1}}{Q_{s1}}} . \quad (77)$$

The right hand side in the above equation denotes the square root of noise to signal ratio. Nose to signal ratio is a standard measure of the signal quality in image processing, and therefore it is appropriate to characterize the uncertainty in the signal in terms of this ratio. From equation (72) obtain $$\frac{|\delta\tau|}{\tau} \leq \frac{\delta|G_{n1}(\omega,v)|}{|G_{n1}(\omega,v)|} + \frac{\delta|G_{n2}(\omega,v)|}{|G_{n2}(\omega,v)|} . \quad (78)$$

From equations (77) and (78) derive $$\frac{|\delta\tau|}{\tau} \leq \sqrt{\frac{Q_{n1}}{Q_{s1}}} + \sqrt{\frac{Q_{n2}}{Q_{s2}}} . \quad (79)$$

Taking the noise to signal ratio to be approximately the same for both images $G_{s1}(\omega, v)$ and $G_{s2}(\omega,v)$ and denoting this common noise to signal ratio by $Q_n/Q_s$ it follows that $$\frac{|\delta\tau|}{\tau} \leq 2\sqrt{\frac{Q_n}{Q_s}} . \quad (80)$$

Therefore, the percentage error in the measurement of $\tau$ is proportional to the square root of the noise to signal ratio. Given this result, one can proceed to estimate the uncertainty in the determination of distance $r_0$ in terms of the noise to signal ratio.

From equations (28) and (30a) obtain $$\tau(\omega,v;r_0) = \frac{|H(\omega,v;e_{a1},r_0)|}{|H(\omega,v;e_{a2},r_0)|} . \quad (81)$$

To simplify notation, the above equation is expressed in the form in the form $$\tau = \frac{|H_1|}{|H_2|} \quad (82)$$

where $$H_1 = H(\omega,v;e_{a1},r_0^0) \text{ and} \quad (83)$$

$$H_2 = H(\omega,v;e_{a2},r_0). \quad (84)$$

From the above equation obtain $$\frac{\delta\tau}{\tau} = \frac{\delta|H_1|}{|H_1|} - \frac{\delta|H_2|}{|H_2|} . \quad (84.5)$$

From equation (83) derive $$\delta|H_1| = \frac{\delta|H_1|}{\partial r_0}\delta r_0 + \frac{\partial|H_1|}{\partial e_{a1}}\delta e_{a1}. \quad (85)$$

In the above equation, $\delta r_0$ is the error in distance, and $\delta e_{a1}, \delta e_{a2}$ are the errors in the measurement of the camera parameters. From equations (80) (85.5), (85), and the property that, for any real numbers a,b, $$|a-b| \geq ||a| - |b||, \quad (86)$$

one can derive the following expression $$|\delta r_0| \leq \frac{2\sqrt{\frac{Q_n}{Q_s}} + \frac{1}{|H_1|}\left|\frac{\partial|H_1|}{\partial e_{a1}}\right||\delta e_{a1}| + \frac{1}{|H_2|}\left|\frac{\partial|H_2|}{\partial e_{a2}}\right||\delta e_{a2}|}{\left|\frac{1}{|H_1|}\left|\frac{\partial|H_1|}{\partial r_0}\right| - \frac{1}{|H_2|}\left|\frac{\partial|H_2|}{\partial r_0}\right|\right|} . \quad (87)$$

The above relation gives the uncertainty (or maximum error bounds) in the determination of distance $r_0$ in terms of the noise to signal ratio and uncertainty in the measurement of the camera parameters. This relation holds for small values of signal to noise ratio and small errors in camera parameters. It can be seen that the uncertainty in the distance is linearly related to square root of noise to signal ratio. In fact, if the uncertainty in the camera parameters is very small, then the uncertainty in distance is proportional to square root of noise to signal ratio. This result is in agreement with intuition.

Additional Features

The image-overlap problem: This method of determining distance presented here involves dividing the original observed images into smaller subimages and processing pairs of subimages separately. Dividing a large image into many smaller subimages introduces some errors due to border effects. An image region cannot be analyzed in isolation because, due to blurring caused by the finite spread of the point-spread-function, the image irradiance distribution produced by one surface patch on the image detector overlaps with the image irradiance distribution produced by adjacent patches. This overlap could be significant at the borders of the image region. This is called the image overlap problem.

In indoor scenes such as the environments of industrial vision systems, the image overlap problem can be completely avoided through selective illumination of the scene. For example, the scene can be illuminated by square bright patches separated by wide dark bands with no illumination. In this case the boundaries of the subimages to be analyzed separately can be chosen to be in the middle of the dark bands. Border effects are then avoided because the image intensity is zero at and near the borders. In situations where the illumination cannot be controlled (e.g. outdoor scenes), the image overlap problem may be reduced as follows. The image intensity is first multiplied by a suitable center weighted (e.g. a Gaussian) mask centered at the region of interest. The resulting weighted image is then used for further processing. Because the weights are higher at the center than at the periphery, this scheme gives an estimate of the unknown quantity which approximately corresponds to the center of the field of view.

Figure 12:
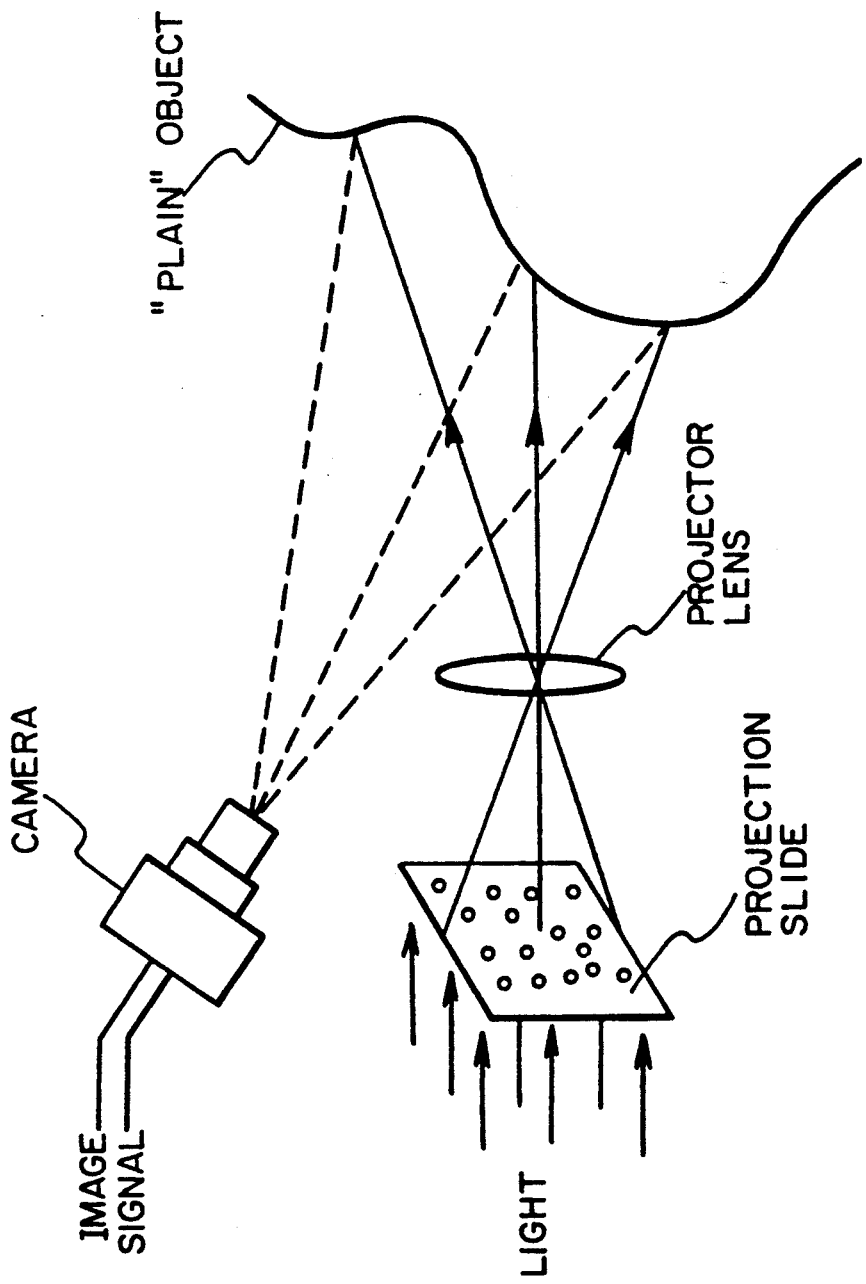
FIG. 12 is a schematic view of an arrangement for introducing brightness variation or "texture" on object surfaces that are "plain", i.e. surfaces that have no reflectance variation, by projecting a desired light pattern onto the surface.

Plain objects: Objects like machine parts, wall, door, road, etc. are often "plain" or "textureless", i.e. their surfaces are smooth and have no reflectance variation. Therefore they appear as objects with constant brightness under uniform illumination. They lack spatial frequency content. In this case, if the illumination of the scene is under control (as in indoor scenes), then spatial frequency content can be artificially introduced by projecting an arbitrary light pattern (e.g. a random dot or "texture" pattern) onto the surface of objects. See FIG. 12. Then the method of the present invention can be applied to determine the distance of the object.

Multiple images: Although the method here requires only a few images, the estimate of the unknown quantity can be made more robust if more images than the required minimum are used. For example, in the case where the distance $r_0$ is the only unknown, in principle only two images are needed. However, if n images are available for different camera parameter settings, then $n-1$ independent estimates of distance can be made and a weighted mean of these estimates gives a more robust estimate of the actual distance. Alternative scheme are also possible of using multiple images.

Deconvolution: The focused image of a surface patch can be obtained by 'dividing the Fourier transform of the observed image by the corresponding optical transfer function.' This operation, called deconvolution is difficult to implement in the practice due to noise and the presence of singularities. Some type of constrained deconvolution should be applied based on some a priori knowledge about the noise characteristics and the image. Signal processing area abounds with literature on this topic. Therefore, this problem is not elaborated on here, but it is understood that some sort of constrained deconvolution is meant when we say deconvolution.

Domain of analysis: The method here is based on a Fourier domain analysis of the images. It is possible to do a corresponding analysis in the spatial or other suitable domain. The Fourier domain has been chosen for its simplicity. Analyses in other domains that are analogous to our Fourier domain analysis are considered to be within the scope of the present invention.

A Design Example: Paraxial Geometric Optics

The following informal algorithm illustrates precomputing and storing the table $T(p,u)$ for the case of Paraxial Geometric Optics.

$D = \text{maximum}(D_1, D_2)$ mm.
$f = \text{maximum}(f_1, f_2)$ mm.
$s = \text{minimum}(s_1, s_2)$ mm.
$(1/u_{max}) = 0$ mm$^{-1}$ (i.e. $u_{max} = \infty$ mm)
$(1/u_{min}) = 1/f$ mm$^{-1}$ (i.e. $u_{min} = f$ mm)
$\delta(1/u) = p/(fD)$ mm$^{-1}$
$\rho_{min} = (2\pi s)/(Np)$ radians/mm
$\rho_{max} = \pi s/p$ radians/mm
$\delta\rho = (2\pi s)/(Np)$ radians/mm
for uinv←$(1/u_{max})$ to $(1/u_{min})$ by increments $\delta(1/u)$ do
begin $$r1 = \frac{D_1}{2}\left(\frac{1}{f_1} - uinv - \frac{1}{s_1}\right),$$

$$r2 = \frac{D_2}{2}\left(\frac{1}{f_2} - uinv - \frac{1}{s_2}\right)$$

For $\rho$←$\rho_{min}$ to $\rho_{max}$ by increments $\delta\rho$ do begin begin $$\text{TABLE}(\rho,uinv) = \frac{r2\, J_1(r1\, \rho)}{r1\, J_1(r2\, \rho)}.$$

end
end

A Numerical Example

Figure 16:
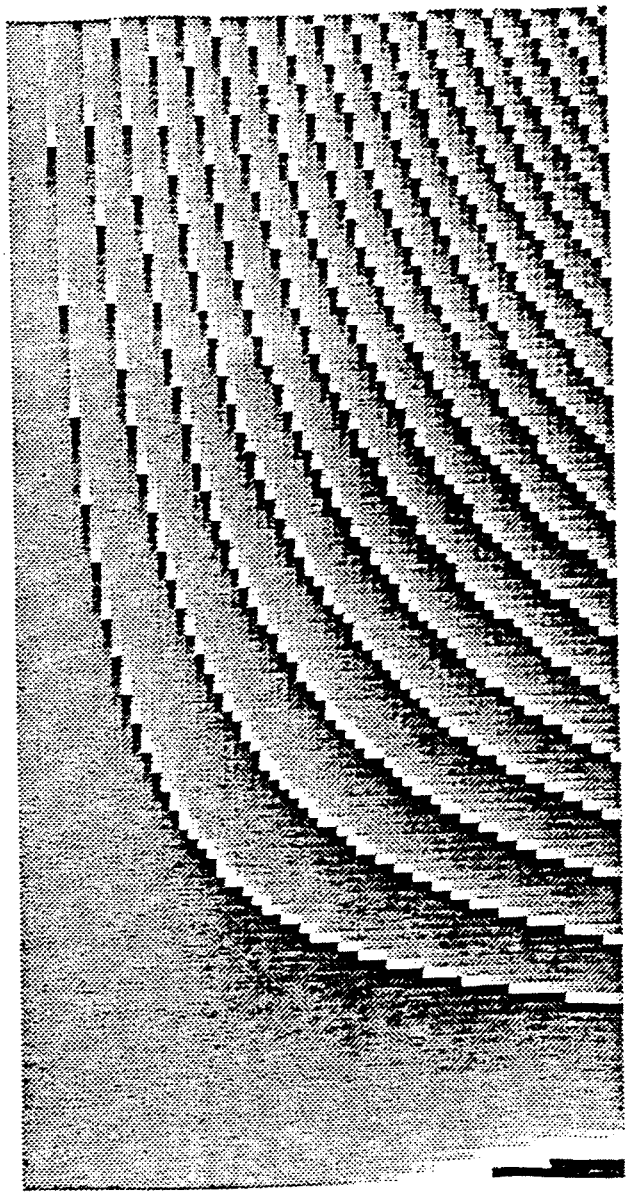
FIG. 16 is an example of a precomputed table for a circularly symmetric optical system based on paraxial geometric optics theory, the table being displayed as a grey-level image.

Panasonic WV-CD 50, is a CCD camera with focal length 16 mm, aperture diameter 10 mm, and pixel size $0.013 \times 0.017$ mm$^2$. The table $T(\rho,u)$ can be easily computed using a computer. The following data is a typical example for such computation.
$f_1 = f_2 = 16$ mm
$D_1 = D_2 = 10$ mm  $s1 = 16.42$ mm, $s2 = 16.67$ mm
$p = 0.017$ mm
$N = 128$ pixels
The computed table values can be thresholded, say at $\pm 1.5$, and shifted and scaled to lie in range 0 and 255. The resulting table can be displayed as a gray-level image. A grey-level image thus computed for this numerical example is shown in FIG. 16. Because the two optical transfer functions cross zero at different values of $\rho$ and $u^{-1}$, nearly periodic discontinuities (jumps from negative infinity to positive infinity) are found. These discontinuities represent boundaries of regions in the $\psi(\rho,u)$ space as sudden change in phase from 0 to $\pi$. Within each region the phase remains the same (i.e. either 0 or $\pi$), but changes at the boundaries of the region from either 0 to $\pi$ or from $\pi$ to 0. In fact the solution for $r_0$ can be determined from only the location of the boundaries of these regions. In this sense $\psi(\rho,u)$ contains information about distance. In this case, due to the nature of $T(\rho,u)$, we get a unique solution for the distance u.

A General Theory for Linear Shift-Invariant Systems

The present invention also contemplates a general theory that is applicable to all linear shift-invariant systems, i.e., systems that perform convolution operation. This theory is essentially a generalization of the method for finding distance of surface patches described earlier. This theory is believed to be useful for a wide variety of instruments that can be molded as linear shift-invariant systems. A camera system is just one example of an instrument where the application of this theory has been presented in complete detail.

The theory presented here deals with a general method for (i) estimating one or more unknown physical parameters of the system that characterize the system, and (ii) to obtain the original input signal of the system from the output of the system.

Let f(x) be an input signal defined in a n-dimensional space where $$x = (x_1, x_2, \ldots, x_n). \tag{101}$$

Figure 13:
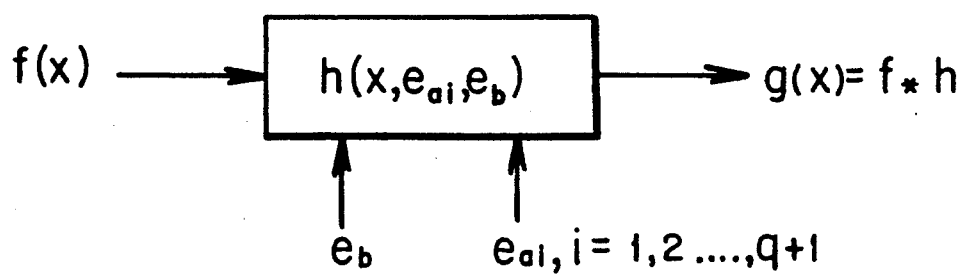
FIG. 13 is a schematic diagram of a general linear shift-invariant system showing input signal, output signal, system point spread function and system parameters which can be set to different values.

Let $e_1, e_2, \ldots, e_m$, be m parameters of a linear shift-invariant system which uniquely determine the "point spread function" (PSF) of the system (see FIG. 13). That is, given the parameters $e_i$ for $i = 1, 2, \ldots, m$, the response of the system to the signal $\delta(x)$ (Dirac delta function) can be uniquely expressed in terms of these parameters. In a physical system, these parameters specify quantities that characterize the physical configuration of the system. The parameters $e_i$ are referenced as system parameters. Let e be defined as $$e = (e_1, e_2, \ldots, e_m). \tag{102}$$

In order to make explicit the dependence of the PSF on system configuration e, denote the PSF as $$h(x;e). \tag{103}$$

Let g(x) represent the output of the system. Since a linear shift-invariant system performs convolution, $$g(x) = h(x;e) * f(x) \tag{104}$$

where * represents the convolution operation. In the Fourier domain, equation (104) can be expressed as $$G(w) = H(w;e)F(w) \tag{105}$$

where $$w = (w_1, w_2, \ldots, w_n) \tag{106}$$

represents the Fourier frequencies corresponding to x, and G(w), H(w;e), F(w) are respectively the Fourier transforms of g(x), h(x;e), and f(x).

Suppose that all the system parameters $e_i$ are known, then the System Transfer Function (STF) H(w;e), by definition, can be determined. Then the original input signal f(x) can be uniquely recovered from the observed signal g(x) through deconvolution (or inverse filtering) as $$F(w) = \frac{G(w)}{H(w;e)}. \tag{107}$$

This operation of recovering the input signal from the observed signal will be called signal restoration In many applications, it is often the case that, in addition to the input signal f(x), one or more of the system parameters $e_i$ are not known. Therefore the STF cannot be determined, and consequently the inverse filtering operation in equation (107) cannot be carried out to recover the input signal. A method is described here for determining these unknown system parameters. Having done this, the input signal can be recovered through inverse filtering (using equation (107)).

Apart from signal restoration, estimation of unknown system parameters itself is of primary interest in many applications, as is the case in finding the distance of objects from a camera system.

Let $e_{i1}, e_{i2}, \ldots, e_{ip}$ be the set of system parameters that are known, and $e_{ip+1}, e_{ip+2}, \ldots, e_{im}$ be the set of system parameters that are unknown. We define $e_a$ and $e_b$ as $$e_a = (e_{i1}, e_{i2}, \ldots, e_{ip}), \tag{108}$$

$$e_b = (e_{ip+1}, e_{ip+2}, \ldots, e_{ip+q}) \text{ for } 1 \leq p, q < m, \text{ and } p+1+m. \tag{109}$$

Note that $e_a$ and $e_b$ together specify all system parameters in e. Therefore equation (105) can be expressed as $$G(w) = H(w; e_a, e_b) F(w). \tag{110}$$

Let the system be such that one or more of the components of $e_a$ can be changed by known amounts. We will denote the different values of $e_a$ by $e_{a1}, e_{a2}, e_{a3}$, etc. The output of the system is then recorded for q+1 different configurations of the system given by $$(e_{a1}, e_b), (e_{a2}, e_b), \ldots, (e_{aq+1}, e_b). \tag{112}$$

Note that $e_b$ is unknown and remains the same in all configurations.

Let $g_1(x), g_2(x), \ldots, g_{q+1}(x)$ be the respective signals for the configurations in expression (112) with the input signal f(x) remaining unchanged. Then, from equation (110) the following set of relations are obtained $$\frac{G_i(w)}{G_{i+1}(w)} = \frac{H(w; e_{ai}, e_b)}{H(w; e_{ai+1}, e_b)} \text{ for } i = 1, 2, 3, \ldots, q. \tag{113}$$

Note that the above equation does not involve the input signal f(x). Therefore it is valid for all inputs, or, equivalently, it is valid for all recorded outputs g(x). There are q equations in q unknowns, the unknowns being the system parameters in $e_b$. Therefore, in principle, these q equations can be solved simultaneously to obtain $e_b$. The solution, however, may not be unique. Therefore, we impose the additional condition that equation (113) be satisfied for all possible frequencies w that are significant in $G_i(w)$ and $G_{i+a}(w)$. This will, in general, give a unique solution of $e_b$. Further, this additional condition can be used to achieve numerical stability in practical applications. Therefore repeat equation (113) is repeated with this additional condition.

$$\frac{G_i(w)}{G_{i+1}(w)} = \frac{H(w; e_{ai}, e_b)}{H(w; e_{ai+1}, e_b)} \text{ for } i = 1, 2, 3, \ldots, q \text{ and} \tag{114}$$

for all w such that $|G_i(w)| \geq \kappa(w)$ and $|G_{i+1}(w)| \geq \kappa(w)$, where $\kappa(w)$ is prespecified based on the signal to noise ratio of the system.

In summary, denote the set of p system parameters that are known by $e_a$ as in equation (108) and the set of q system parameters that are unknown by $e_b$ as in equation (109), i.e.

$$e_a=(e_{i1},e_{i2},\ldots,e_{ip}), e_b=(e_{ip+1},e_{ip+w},\ldots,e_{ip+q}).$$

Set the known system parameters specified by $e_a$ to $e_{ai}$ while keeping the unknown system parameters specified by $e_b$ unchanged. Input the possibly unknown signal $f(x)$ to the system and record the output $g_i(x)$.

Repeat the above two steps for $i=1,2,3,\ldots,q+1$, such that $e_{aj}\neq e_{ai}$ for $i\neq j$ where $i,j=1,2,3,\ldots,q+1$. Depending on the characteristics of the system, process all the recorded outputs $g_i(x)$ to normalize them.

Compute the Fourier transformers $G_i(w)$ of $g_i(x)$ for $i=1,2,3,\ldots,q+1$. Specify a threshold parameter function $\kappa(w)$ based on the noise characteristics of the system.

For all $w$ such that $|G_i(w)|\geq\kappa(w)$ and $|G_{i+1}(w)|\geq\kappa(w)$, computer the ratio $$T(w) = \frac{G_i(w)}{G_{i+1}(w)},$$

for $i=1,2,3,\ldots,q$. Formulate the set of equations $$T(w) = \frac{H(w;e_{ai},e_b)}{H(w;e_{ai+1},e_b)},$$

for $i=1,2,3,\ldots,q$.

Solve the step of equations in the step above by some method, e.g. analytical method, numerical iterative method, or table lookup method, to obtain the q unknown system parameters specified by $e_b$. The solution should be consistent for all $w$. Compute the Fourier transform of the signal as $$F(w) = \frac{G_k(w)}{H(w;e_{ai},e_b)},$$

for some $k$ where $k\in\{1,2,3,\ldots,q+1\}$.

Take the Fourier inverse transform of $F(w)$ to recover the original input signal $f(x)$.

Figure 14:
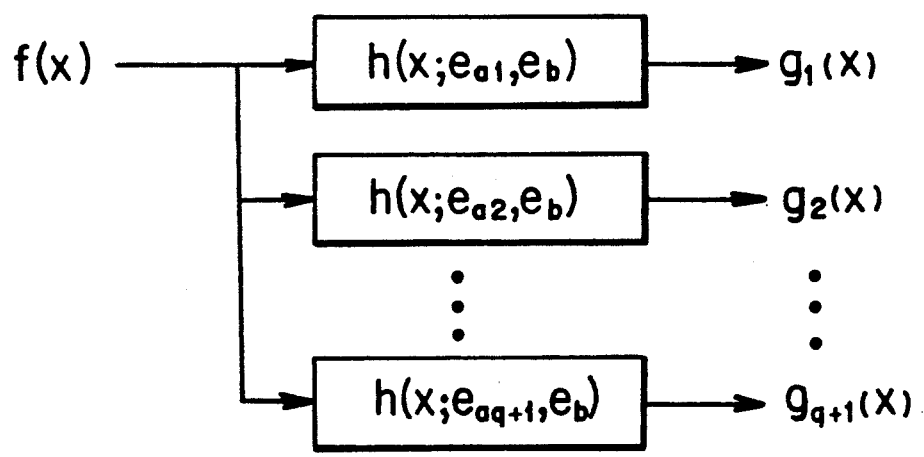
FIG. 14 is a schematic diagram of a system of q+1 linear shift-variant systems having different system parameters and connected to the same input signal.

As stated above, the output of the system should be recorded for $q+1$ different configurations given in expression (112) (FIG. 11a). Alternatively, one can use $q+1$ separate linear systems, each having one configuration in expression (112) (see FIG. 14). The same input signal $f(x)$ is fed to all the $q+1$ systems, their outputs are recorded, and processed to obtain $e_b$.

The system configuration specified by $e_b$ should be the same for all $q+1$ recorded outputs. However $e_b$ can change provided that the amount of change is known. For example, $q+1$ configurations corresponding to $e_b$ can be $$e_b+e_{b1}, e_b+e_{b2},\ldots,e_b+e_{bq+1}, \quad (115)$$

where $e_{b1}, e_{b2},\ldots, e_{bq+1}$, are all known. In this case again, one can write q equations corresponding to equation (114) in exactly q unknowns. They can be solved to obtain $e_b$.

Given that the system of equations (114) is sufficiently constrained (i.e. the number of solutions is finite), then two approaches can be taken to solve them. First, where possible, analytic expressions for the solution could be derived and used to solve the equations. In this case, one needs to know the explicit analytic expression for $H(w;e_a,e_b)$ and also the system configuration $e_a$.

In practice, solving the equations analytically might be very difficult or even impossible. In this case a table look-up method could be used. Here we tabulate the functions $T_i(w,e_b)$ given by $$T_i(w,e_b) = \frac{H(w;e_{ai},e_b)}{H(w;e_{ai+1},e_b)} \text{ for } i = 1,2,3,\ldots,q. \quad (116)$$

for all possible values $w$ and $e_b$ (i.e. at small discrete intervals in practice). This table is then sorted with respect to $w$ and $T_i$ and stored in a new table $e_b(w,T_i)$. This new table could be multiple-valued. Given $w$ and $T_i$ where $T_i$ is computed rom the recorded signal as $$T_i = \frac{G_i(w)}{G_{i+1}(w)}, \quad (117)$$

the set of possible solutions for $e_b$ is obtained by indexing into the table $e_b(w,T_i)$. Intersecting such sets over all $w$ and $i$ gives the solution for $e_b$, i.e.

$$e_b = \bigcap_w \bigcap_{i=1}^{q} e_b(w,T_i). \quad (118)$$

Efficient computational method for set intersections can be used to find the unique solution.

There are two methods for obtaining the table $T_i(w,e_b)$ from which the required table $e_b(w,T_i)$ is derived. The first one is by using the analytic expression for the STF $H(w;e_{ai},e_b)$ and computing the right hand side of equation (116). This requires accurate knowledge of $e_{ai}$ through measurements on the linear system. The second is through experiments. The experimental method is convenient if an analytic expression for $H(w;e_{ai},e_b)$ is not available, or it is difficult to compute, or it is difficult to measure $e_{ai}$ of the system accurately. In this case, the output of the system $g_i(x)$ is recorded for each configuration $e_b$ and the table entry is computed as $$T_i(w,e_b) = \frac{G_i(w;e_{ai},e_b)}{G_{i+1}(w;e_{ai+1},e_b)} \text{ for } i = 1,2,3,\ldots,q. \quad (119)$$

Note that, it is not necessary to know the actual signal $f(x)$ to experimentally determine the table. However, one needs to be able to measure $e_b$ accurately during this calibration procedure.

The table size for storing the table depends on the capabilities of the actual physical system, the accuracy with which it can be calibrated, the accuracy with which the signal $g(x)$ and the system parameters $e_{ai}$ can be measured, and the accuracy of the analytical expression for the STF $H(w;e)$.

The system of equations (114) constitutes q equations in exactly q unknowns. Therefore, it is just exactly constrained. It requires only $q+1$ recorded outputs. However, the accuracy of the results can be improved by using more output recordings than just the required minimum. For example, if $q+2$ recordings are used, then two estimates of the unknown $e_b$ can be made, the first estimate using the first $q+1$ output recordings, and the second estimate from the last $q+1$ output recordings. A weighted average of separate estimates of the unknown $e_b$ then gives a more robust estimate than the individual dual estimates.

Other results can be derived for this general theory that have direct analogy to the results derived earlier for the special theory of camera systems. For example, an equation for determining the uncertainty in the solution for the unknown system parameters in terms of the uncertainty in the signal measurement and the known system parameters can be derived. All such results are within the scope of the present invention as defined by the claims.

Conclusion, Ramifications, and Scope of Invention

In this invention, efficient computational methods and electronic camera apparatus for determining the distance of objects, rapid autofocusing of camera systems, and obtaining improved focus images from blurred images have been disclosed. The method has been generalized to determined the value of one or more camera parameters of the camera system. The method has been further generalized to input signal restoration and system parameter estimation in any linear shift-invariant system. This generally theory is applicable to a wide range of measuring instruments which can be molded a linear shift-invariant systems. An electronic camera system is only one example of the large class of instruments where the application of this general theory has been presented in detail.

The present invention was mainly conceived in the context of machine vision applications such as robot vision, autonomous vehicle navigation, a means for finding approximate distance of objects as part of a stereo vision system, etc. There are also other applications where this invention can be used after minor modifications. For example it is useful in television microscopy in obtaining improved focus images of three-dimensional specimens, and in commercial television broadcasting of images where objects in both the foreground and the background are in focus. It is also useful in commercial video recorders for rapid autofocusing of desired objects in the scene. Another application is a completely electronic camera where taking a picture involves storing the image signal directly on a magnetic disk for two or more camera settings, and then processing this image signal on a computer in conjunction with camera characteristics to obtain pictures with desired depth-of-field.

While the description in this report of the method, apparatus, and applications contains many specificities, these should not be construed as limitations on the scope of the invention, but rater as exemplifications of preferred embodiments thereof. Further modifications and extensions of the present invention herein disclosed will occur to persons skilled in art to which the present invention pertains, and all such modifications are deemed to be within the scope and spirit of the present invention as defined by the appended claims and their legal equivalents thereof.

I claim:

1. A method of determining the distance of a surface patch of an object from a camera system having an aperture through which light enters, an image detector, an image forming optical system having first and second principal planes and a focal length, said second principal plane arranged closer to said image detector than said first principal plane, a light filter, a camera controller, and an image processor operatively connected to said image detector and to said camera controller, said method comprising:

a) setting said camera to a first set of camera parameters including at least one of (i) distance (s) between said second principal plane and said image detector, (ii) diameter (D) of said camera aperture, (iii) focal length (l) of said camera system, and (iv) spectral characteristic ($\lambda$) of light transmitted by said light filter;
b) forming a first image of said surface patch on said image detector;
c) recording said first image in said image processor as a first digital image;
d) preprocessing said first digital image to provide a first normalized image which is related to the point spread function of said camera system by a convolution operation;
e) calculating a first set of Fourier coefficients of said first normalized image at a set of discrete spatial frequencies;
f) changing at least one of said camera parameters;
g) forming a second image of said surface patch on said image detector;
h) recording said second image in said image processor as a second digital image;
i) preprocessing said second digital image to provide a second normalized image which is related to the point spread function of said camera by a convolution operation;
j) calculating a second set of Fourier coefficients of said second normalized image at said set of discrete spatial frequencies;
k) dividing said first set of Fourier coefficients by said second set of Fourier coefficients to provide a set of ratio values;
l) providing a signal mathematical relationship corresponding to each member of said set of ratios, said mathematical relationship provided without any intermediate parameter and representing the ratio of the optical transfer function of said first normalized image to the optical transfer function of said second normalized image, each said mathematical relationship dependent only on said camera parameters and having one unknown equal to said distance of said surface patch from said camera system;
m) substituting each ratio value resulting from step (k) in the signal corresponding mathematical relationship provided in step (l) to obtain a set of equations; and
n) solving said set of equations resulting from step (m) to determine said distance of said surface patch from said camera system.

2. The method of claim 1 which further includes selecting said surface patch of said object in a square field-of-view centered at selection coordinates $\theta_0$, $\phi_0$ and having corner points at $\theta_i$, $\phi_0$, where i=1,2,3,4, said selecting performed after forming of said first and second images in steps (b) and (g) and said recording of said images in steps (c) and (h).

3. The method of claim 1 wherein said preprocessing set forth in steps (d) and (i) include at least one of the following operations:

i) correcting for sensor-response characteristic of said image detector,
 ii) correcting for non-uniform light transmission of said image forming optical system,
 iii) normalization of the brightness of said first and second images, and
 iv) magnification normalization.

4. The method of claim 1 wherein said first normalized image resulting from step (d) is stored in said image processor and is used after said second normalized image resulting from step (i) has been calculated in order to find the ratio of values of step (k).

5. The method of claim 1 wherein the region surrounding the border of said surface patch is kept dark whereby image-overlap is avoided and accuracy of said distance of said surface patch determination is enhanced.

6. The method of claim 1 wherein said surface patch is illuminated by projecting a light pattern onto it whereby a brightness variation is provided for determination of said distance of said surface patch.

7. The method of claim 1 which further comprises dividing the complete field-of-view of said camera system into many subfields-of-view each containing a surface patch, and performing steps (a) through (n) for each said surface patch whereby said distances of all surface patches are determined.

8. A method of determining the distance of a surface patch of an object from a camera system having an aperture through which light enters, an image detector, an image forming optical system having first and second principal planes and a focal length, said second principal plane arranged closer to said image detector than said first principal plane, a light filter, a camera controller, and an image processor operatively connected to said image detector and to said camera controller, said method comprising:

a) setting said camera to a first set of camera parameters including at least one of (i) distance (s) between said second principal plane and said image detector, (ii) diameter (D) of said camera aperture, (iii) focal length (f) of said camera system, and (iv) spectral characteristic ($\lambda$) of light transmitted by said light filter;
  b) forming a first image of said surface patch on said image detector;
  c) recording said first image in said image processor as a first digital image;
  d) preprocessing said first digital image to provide a first normalized image which is related to the point spread function of said camera system by a convolution operation;
  e) calculating a first set o Fourier coefficients of said first normalized image at a set of discrete spatial frequencies;
  f) changing at least one of said camera parameters;
  g) forming a second image of said surface patch on said image detector;
  h) recording said second image in said image processor as a second digital image;
  i) preprocessing said second digital image to provide a second normalized image which is related to the point spread function of said camera by a convolution operation;
  j) calculating a second set of Fourier coefficients of said second normalized image at said set of discrete spatial frequencies;
  k) dividing said first set of Fourier coefficients by said second set of Fourier coefficients to provide a set of ratio values;
  l) comparing the set of ratio values resulting from step (k) to a look-up table in said image processor, said look-up table having stored ratio values corresponding to distances from said camera system, and
  m) determining said distance of said surface patch from said camera system by the selection of that distance which corresponds most closely to the ratio values from step (k).

9. The method of claim 8 wherein said look-up table has been provided by calculating discrete distances corresponding to said ratio values resulting from step (k) and storing same in said image processor.

10. The method of claim 8 wherein said look-up table has been experimentally provided by measuring the distances from said camera system for the set of ratio values resulting from step (k).

11. A method for focusing a surface patch of an object on an image detector of a camera system having an aperture through which light enters, an image forming optical system having first and second principal planes and a focal length, said second principal plane arranged closer to said image detector than said first principal plane, a light filter, a camera controller, and an image processor operatively connected to said image detector and to said camera controller, said method comprising:

a) setting said camera to a first set of camera parameters including at least one of (i) distance (s) between said second principal plane and said image detector, (ii) diameter (D) of said camera aperture, (iii) focal length (f) of said camera system, and (iv) spectral characteristic ($\lambda$) of light transmitted by said light filter;
  b) forming a first image of said surface patch on said image detector;
  c) recording said first image in said image processor as a first digital image;
  d) preprocessing said first digital image to provide a first normalized image which is related to the point spread function of said camera system by a convolution operation;
  e) calculating a first set of Fourier coefficients of said first normalized image at a set of discrete spatial frequencies;
  f) changing at least one of said camera parameters;
  g) forming a second image of said surface patch on said image detector;
  h) recording said second image in said image processor as a second digital image;
  i) preprocessing said second digital image to provide a second normalized image which is related to the point spread function of said camera by a convolution operation;
  j) calculating a second set of Fourier coefficients of said second normalized image at said set of discrete spatial frequencies;
  k) dividing said first set of Fourier coefficients by said second set of Fourier coefficients to provide a set of ratio values;
  l) providing a single mathematical relationship corresponding to each number of said set of ratios, said mathematical relationship provided without any intermediate parameter and representing the ratio of the optical transfer function of said first normalized image to the optical transfer function of said second normalized image, each said mathematical relationship dependent only on said camera parameters and having one unknown equal to said distance of said surface patch from said camera system;
  m) substituting each ratio value resulting from step (k) in the single corresponding mathematical relationship provided in step (l) to obtain a set of equations;

n) solving said set of equations resulting from step (m) to determine said distance of said surface patch from said camera system;

o) based on the distance determined in step (n), determining the camera parameters corresponding to a focused image of said surface patch; and p) adjusting said camera parameters to the values determined in step (o).

12. The method of claim 11 wherein said camera parameters are determined in step (o) by calculation using a focusing formula.

13. The method of claim 11 wherein said camera parameters are determined in step (o) by indexing the calculated distance into a prestored look-up table in said image processor which provides camera parameter values which bring said surface patch into focus.

14. A method for focusing a surface patch of an object on an image detector of a camera system having an aperture through which light enters, an image forming optical system having first and second principal planes and a focal length, said second principal plane arranged closer to said image detector than said first principal plane, a light filter, a camera controller, and an image processor operatively connected to said image detector and to said camera controller, said method comprising:

a) setting said camera to a first set of camera parameters including at least one of (i) distance (s) between said second principal plane and said image detector, (ii) diameter (D) of said camera aperture, (iii) focal length (f) of said camera system, and (iv) spectral characteristic ($\lambda$) of light transmitted by said light filter;

b) forming a first image of said surface patch on said image detector;

c) recording said first image in said image processor as a first digital image;

d) preprocessing said first digital image to provide a first normalized image which is related to the point spread function of said camera system by a convolution operation;

e) calculating a first set of Fourier coefficients of said first normalized image at a set of discrete spatial frequencies;

f) changing at least one of said camera parameters;

g) forming a second image of said surface patch on said image detector;

h) recording said second image in said image processor as a second digital image;

i) preprocessing said second digital image to provide a second normalized image which is related to the point spread function of said camera by a convolution operation;

j) calculating a second set of Fourier coefficients of said second normalized image at said set of discrete frequencies;

k) dividing said first set of Fourier coefficients by said second set of Fourier coefficients to provide a set of ratio values;

l) comparing the set of ratio values resulting from step (k) to a look-up table in said image processor, said look-up table having stored ratio values corresponding to distance from said camera system;

m) determining said distance of said surface patch from said camera system by the selection of that distance which corresponds most closely to the ratio values from step (k);

n) based on said distance determined in step (m), determining camera parameters corresponding to a focused image of said surface patch; and p) adjusting said camera parameters to the values determined in step (n).

15. The method of claim 14 wherein said camera parameters are determined in step (n) by calculation using a focusing formula.

16. The method of claim 14 wherein said camera parameters are determined in step (n) by indexing the calculated distance into a prestored look-up table in said image processor which provides the camera parameter values which bring said surface patch into focus.

17. A method for obtaining an improved focus image of a surface patch of an object from its blurred image in a camera system having an aperture through which light enters, an image detector, an image forming optical system having first and second principal planes and a focal length, said second principal plane arranged closer to said image detector than said first principal plane, a light filter, a camera controller, and an image processor operatively connected to said image detector and to said camera controller, said method comprising:

a) setting said camera to a first set of camera parameters including at least one of (i) distance (s) between said second principal plane and said image detector, (ii) diameter (D) of said camera aperture, (iii) focal length (f) of said camera system, and (iv) spectral characteristic ($\lambda$) of light transmitted by said light filter;

b) forming a first image of said surface patch on said image detector;

c) recording said first image in said image processor as a first digital image;

d) preprocessing said first digital image to provide a first normalized image which is related to the point spread function of said camera system by a convolution operation;

e) calculating a first set of Fourier coefficients of said first normalized image at a set of discrete spatial frequencies;

f) changing at least one of said camera parameters;

g) forming a second image of said surface patch on said image detector;

h) recording said second image in said image processor as a second digital image;

i) preprocessing said second digital image to provide a second normalized image which is related to the point spread function of said camera by a convolution operation;

j) calculating a second set of Fourier coefficients of said second normalized image at said set of discrete spatial frequencies; 'k) dividing said firs set of Fourier coefficients by said second set of Fourier coefficients to provide a set of ratio values;

l) providing a single mathematical relationship corresponding to each member of said set of ratios, said mathematical relationship provided without any intermediate parameter and representing the ratio of the optical transfer function of said first normalized image to the optical transfer function of said second normalized image, each said mathematical relationship dependent only on said camera parameters and having one unknown equal to said distance of said surface patch from said camera system;

m) substituting each ratio value resulting from step (k) in the single corresponding mathematical relationship provided in step (l) to obtain a set of equations;

n) solving said set of equations resulting from step (m) to determine said distance of said surface patch from said camera system;

o) based on the distance of said surface patch calculated in step (n), determining the optical transfer function of said first image formed in step (b);

p) determining the Fourier transform of said first image;

q) dividing said Fourier transform resulting from step (p) by said optical transfer function resulting from step (o); and r) computing the inverse Fourier transform of the result from step (q), whereby said improved focus image is determined from its blurred image.

18. The method of claim 17 which further includes dividing the complete field-of-view of said camera system into many subfields-of-view each containing a surface patch and repeating steps (a) through (r) for each surface patch thereby determining the improved focus image of all surface patches, and from these improved focus images synthesizing a focused image of the entire scene in the field-of-view of said camera system.

19. An apparatus for determining the distance between a surface patch of an object and a camera system comprising:

a) a camera system including an image detector, a camera aperture, an image forming optical system having first and second principal plane, a light filter and a focal length, said second principal plane arranged closer to said image detector than said first principal plane;

b) a camera controller operatively connected to said camera system for movement thereof to change one or more of the following camera parameters,
(i) the distance between said principal plane and said image detector,
(ii) the diameter of said camera aperture, and
(iii) said focal length of said image forming optical system;

c) an image processor operatively connected to said image detector and to said camera controller for receipt of signals from said image detector, the image processor varying said camera parameters by means of said camera controller, wherein said image processor includes:
(i) means for converting the image detector signal to digital data and normalizing the resulting digital image for further image processing;
(ii) means for Fourier transforming signals, and
(iii) means for dividing Fourier coefficients to provide a set of Fourier coefficient ratio values corresponding to signals from a first and a second image; and d) means for substituting Fourier coefficient ratio values gathered from said first and second images into a mathematical relationship involving the camera parameters, the distance of said surface patch and the optical transfer function of said camera system, the means for substituting Fourier coefficient ratio values also solving the resulting relationships to provide the distance of said surface patch from said camera system.

20. An apparatus for determining the distance between a surface patch of an object and a camera system as defined by claim 19 wherein said image processor further includes at least one of:
a) means for correcting sensor-response characteristics of said image detector,
b) means for correcting non-uniform light transmission of said image forming optical system,
c) means for normalization of brightness of images, and
d) means for normalization of magnification of images recorded on said image detector.

21. An apparatus for determining the distance between a surface patch of an object and a camera system comprising:

a) a camera system including an image detector, a camera aperture, an image forming optical system having first and second principal planes, a light filter and a focal length, said second principal plane arranged closer to said image detector than said first principal plane;

b) a camera controller operatively connected to said camera system for movement thereof to change one or more of the following camera parameters,
(i) the distance between said second principal plane and said image detector,
(ii) the diameter of said camera aperture, and
(iii) the focal length of said image forming optical system;

c) an image processor operatively connected to said image detector and to said camera controller for receipt of signals from said image detector, the image processor varying said camera parameters by means of said camera controller, wherein said image processor includes:
(i) means for converting the image detector signal to digital data and normalizing the resulting digital image for further image processing,
(ii) means for Fourier transforming signals, and
(iii) means for dividing Fourier coefficients to provide a set of Fourier coefficient ratio values corresponding to signals from a first and a second image, d) a look-up table computed from the optical transfer function of said camera system, and e) correlation means to determine distances by comparing said set of Fourier coefficient ratio values with values stored in said look-up table.

22. An apparatus for determining the distance between a surface patch of an object and a camera system as defined by claim 21 wherein said image processor further includes at least one of:
a) means for correcting sensor-response characteristics of said image detector,
b) means for correcting non-uniform light transmission of said image forming optical system,
c) means for normalization of brightness of images, and
d) means for normalizing magnification of images recorded on said image detector.

* * * * *

UNITED STATES PATENT AND TRADEMARK OFFICE
CERTIFICATE OF CORRECTION

PATENT NO. : 5,193,124
DATED : March 9, 1993
INVENTOR(S) : Subbarao, M.

It is certified that error appears in the above-identified patent and that said Letters Patent is hereby corrected as shown below:

<u>In Column 1, Line 9</u> should read, --This is a continuation-in-part of copending application serial no. 373,996, filed on June 29, 1989.--

Signed and Sealed this

Seventeenth Day of April, 2001

Attest:

NICHOLAS P. GODICI

Attesting Officer     Acting Director of the United States Patent and Trademark Office